(12) United States Patent
Bylander et al.

(10) Patent No.: US 8,442,375 B2
(45) Date of Patent: May 14, 2013

(54) ASSEMBLY TOOL AND OPTICAL CONNECTOR ASSEMBLY METHOD

(75) Inventors: James R. Bylander, Austin, TX (US); Richard L. Simmons, Leander, TX (US); Curtis L. Shoemaker, Round Rock, TX (US); Joseph M. Van Allen, Cedar Park, TX (US); Donald K. Larson, Cedar Park, TX (US); Joseph C. Sawicki, Austin, TX (US); Ronald P. Pepin, Georgetown, TX (US); Martin G. Afflerbaugh, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 375 days.

(21) Appl. No.: 12/789,984

(22) Filed: May 28, 2010

(65) Prior Publication Data
US 2010/0316344 A1    Dec. 16, 2010

Related U.S. Application Data

(60) Provisional application No. 61/187,401, filed on Jun. 16, 2009, provisional application No. 61/237,741, filed on Aug. 28, 2009.

(51) Int. Cl.
*G02B 6/00* (2006.01)
(52) U.S. Cl.
USPC .......................................... 385/134; 385/137
(58) Field of Classification Search ................... None
See application file for complete search history.

(56) References Cited

U.S. PATENT DOCUMENTS

| | | | |
|---|---|---|---|
| 4,627,561 A | 12/1986 | Balyasny et al. |
| 5,080,460 A | 1/1992 | Erdman et al. |
| 5,088,804 A | 2/1992 | Grinderslev |
| 5,102,211 A | 4/1992 | Slaney et al. |
| 5,337,390 A | 8/1994 | Henson et al. |
| 5,408,558 A | 4/1995 | Fan |
| 5,414,790 A | 5/1995 | Lee et al. |
| 5,563,974 A | 10/1996 | Carpenter et al. |
| 5,862,289 A | 1/1999 | Walter et al. |
| 6,565,265 B2 | 5/2003 | Ohtsuka et al. |

(Continued)

FOREIGN PATENT DOCUMENTS

| JP | 2002-341181 | 11/2002 |
|---|---|---|
| WO | WO 2009/035776 A1 | 3/2009 |

OTHER PUBLICATIONS

U.S. Appl. No. 61/170152, filed Apr. 17, 2009, entitled "Bladeless Optical Fiber Cleaver".

*Primary Examiner* — Tina Wong
(74) *Attorney, Agent, or Firm* — Janet A. Kling

(57) ABSTRACT

An assembly tool for installing an optical fiber in an optical connector includes a base and a protrusion setting station. The base includes a connector mount disposed in the base. The connector mount can be configured to receive and secure the optical connector on the base where the connector has a housing and a connector ferrule. The protrusion setting station enables the craftsperson to set distance (or protrusion) that a terminal end of the optical fiber extends from an end face of the connector ferrule. The protrusion station includes a light source to illuminate the terminal end of the optical fiber, at least one black body absorber to eliminate unwanted reflected light and a window to visualize the terminal end of the optical fiber protruding from the end face of the connector ferrule.

16 Claims, 20 Drawing Sheets

U.S. PATENT DOCUMENTS

| | | |
|---|---|---|
| 6,846,111 B2 | 1/2005 | Otsu et al. |
| 7,116,882 B2 | 10/2006 | Watte et al. |
| 7,140,950 B1 | 11/2006 | Bylander et al. |
| 7,194,179 B1 | 3/2007 | Bryant et al. |
| 7,280,733 B2 | 10/2007 | Larson et al. |
| 7,720,345 B2 * | 5/2010 | Katagiyama et al. ......... 385/137 |
| 2001/0033730 A1 | 10/2001 | Fentress |
| 2003/0063868 A1 | 4/2003 | Fentress |
| 2007/0104445 A1 * | 5/2007 | Larson et al. ................ 385/134 |
| 2008/0226236 A1 | 9/2008 | Pepin et al. |

* cited by examiner

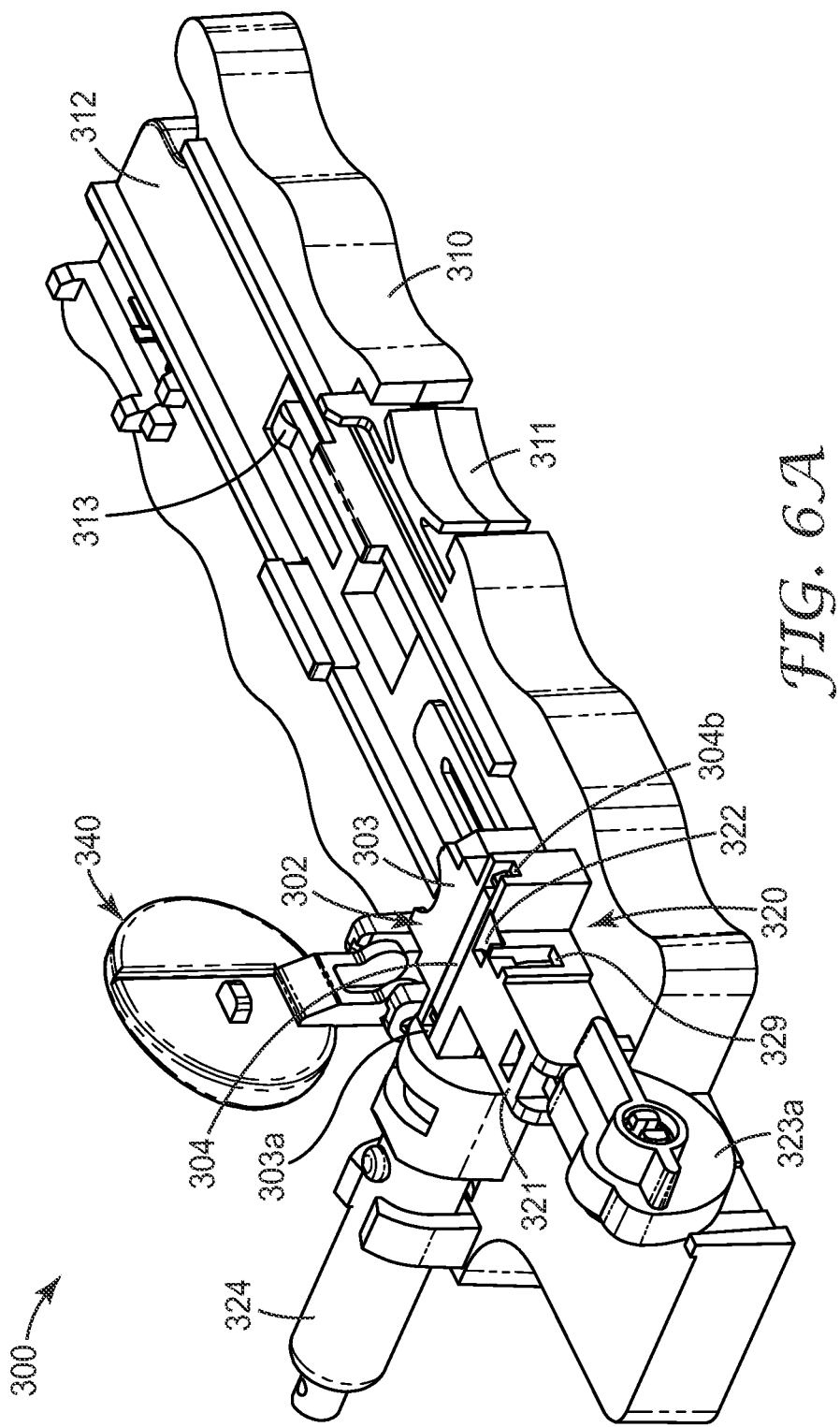

ASSEMBLY TOOL AND OPTICAL CONNECTOR ASSEMBLY METHOD

CROSS-REFERENCE TO RELATED APPLICATIONS

This application claims the benefit of U.S. Provisional Patent Application No. 61/187,401, filed Jun. 16, 2009, and U.S. Provisional Patent Application No. 61/237,741, filed Aug. 28, 2009, the disclosures of which are incorporated by reference herein in their entirety.

BACKGROUND OF THE INVENTION

1. Field of the Invention

The present invention is directed to an apparatus and method for assembling remote grip ferrule-based optical connectors.

2. Background

In the area of optical telecommunication networks, fiber optic connectors are one of the primary ways to connect two or more optical fibers. There are several classes of optical fiber connectors including adhesive ferruled connectors, in which the fiber tip is held in a substantially fixed position relative to the end face of the ferrule by adhesively securing the fiber within the bore of the ferrule. Yet another class of connectors includes non-ferrule connectors, which rely on the buckling of a length of fiber to create contact pressure. Another class of connectors includes remote grip (ferruled) connectors, where the fiber is secured at some distance away from the terminal end or tip of the fiber.

When installing a remote grip connector in the field, one current practice uses a coplanar/flush polish. In remote grip connectors, as with other connector types, low optical losses and minimal reflections are achieved when the terminal ends of at least two optical fibers make secure physical contact. However, any differences in the coefficient of expansion between the fiber, the ferrule, etc. within the assembly may result in a non-contacting fiber tip when the temperature is raised or lowered. The resulting gap can lead to poor insertion loss and significant back reflection. Conventional remote grip connectors are described in U.S. Pat. No. 5,408,558 and U.S. Patent Publication No. 2008-0226236.

Another current practice involves a technician performing a field polish to create a fiber terminal end which protrudes slightly beyond the ferrule tip. This method of polishing remote grip connectors produces a range of protrusions that provide a secure physical contact while avoiding excess force on the fiber tips.

Independent of whether using a flush polish, a protruding polish, or no polish, it is beneficial to secure the fiber so that the fiber tip protrudes a known amount. In the case where the fiber is polished after insertion, setting the protrusion and securing the optical fiber in the optical connector, the amount of polishing needed is minimized. In the case where no final polishing is done to the fiber, the protrusion setting step of the assembly process defines the final protrusion of the fiber from the end face of the connector ferrule. For example, a method of setting fiber protrusion is described in U.S. Pat. No. 7,194,179.

Before inserting the fiber into a connector, the fiber is typically stripped and cleaved. Removing of any jacket material from the fiber optic cable and stripping away the buffer coating exposes the bare glass fiber which can then be fitted through a standard fiber optic connector ferrule. Cleaving provides an end face that is nearly perpendicular to the axis of the fiber and reduces the amount of polishing required. An appropriate cleave length (the distance between the fiber tip and the end of the polymer coating) is necessary to ensure that a sufficient amount of fiber can extend beyond the tip of the ferrule.

Viewing the glass fiber protruding from the end face of the ferrule prior to securing the fiber in the connector provides the assurance that the fiber has been successfully inserted through the connector. However, the small diameter and length of the protruding fiber tip makes unaided viewing difficult. Magnification using eye loops and microscopes has been proposed, but these solutions are not always practical in the field. Therefore, a need exists for a craft friendly tool that provides a better way of determining the presence or absence of the fiber tip protruding from the end face of an optical connector ferrule.

SUMMARY OF THE INVENTION

An assembly tool for installing an optical fiber in an optical connector includes a base and a protrusion setting station. The base includes a connector mount disposed in the base. The connector mount can be configured to receive and releasably secure the optical connector to the base where the connector includes a housing and a connector ferrule. The protrusion setting station enables the craftsperson to set the protrusion that the terminal end of the optical fiber extends from an end face of the connector ferrule. The protrusion station includes a light source to illuminate the terminal end of the optical fiber, at least one black body absorber to eliminate unwanted reflected light and a window to visualize the terminal end of the optical fiber protruding from the end face of the connector ferrule.

The terminal end of the optical fiber extending from the end face of the connector ferrule can act as a lens to focus and redirect the light when the fiber is inserted into a propagation path of the light. A portion of the light can be redirected at a vertical angle of about 30° to about 60° relative to the propagation path of the light. The window in the housing of the assembly tool can be located to view this focused, redirected light.

In another exemplary aspect, a method of installing an optical fiber in a connector having a defined protrusion is disclosed. An optical fiber is prepared by removing any jacketing material, stripping off the buffer coating and cleaving the bare glass fiber to an appropriate length. An optical connector having a housing and a ferrule is inserted into an assembly tool and held in place by a connector mount. The prepared terminal end of the optical fiber is inserted into and through the connector. The terminal end of the optical fiber protruding from the end face of the connector ferrule can be viewed to verify the successful insertion of the optical fiber into the connector. A cam assembly can be engaged to push the optical fiber extending from the ferrule back into the connector until the terminal end of the optical fiber protrudes from the end face of the ferrule by a predetermined amount after which the optical fiber is secured in the connector.

BRIEF DESCRIPTION OF THE DRAWINGS

The present invention will be further described with reference to the accompanying drawings, wherein:

FIG. 6A shows an isometric view of a third embodiment of an exemplary assembly tool according to the current invention.

Figure 1:
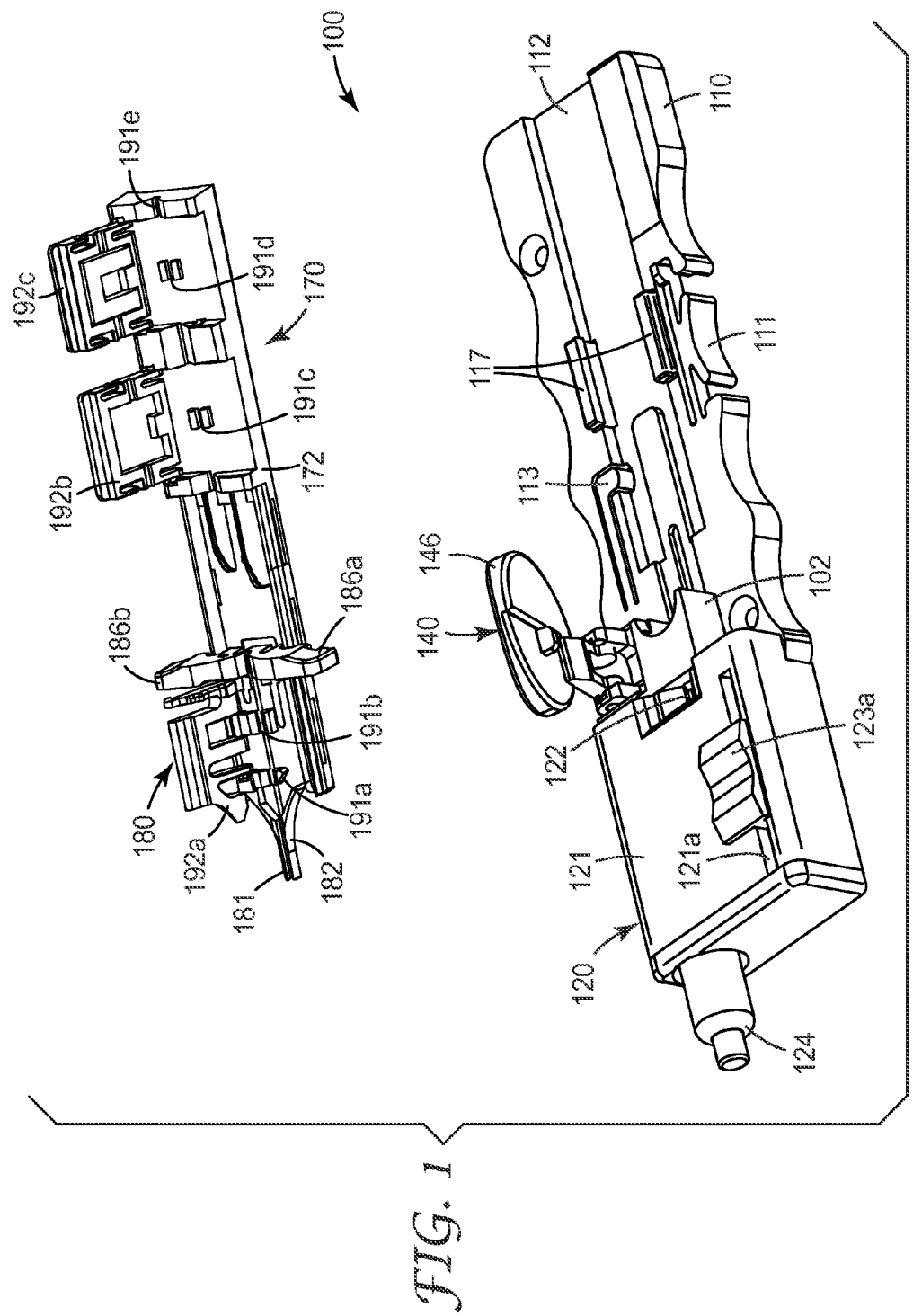
FIG. 1 shows an isometric view of an assembly tool according to an exemplary embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "forward," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to an assembly tool and method of installing an optical fiber in an optical connector, where the fiber is set to a predetermined fiber protrusion. Setting the amount of the fiber protruding from the end face of the connector ferrule can minimize and simplify or eliminate the final polishing step in the connector installation process.

Figure 2A:
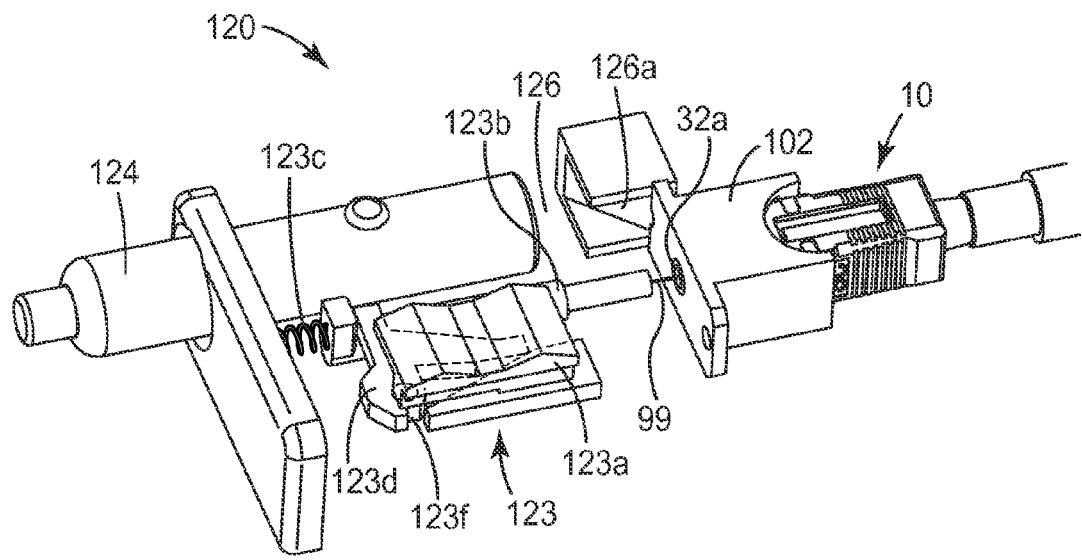
FIG. 2A shows a schematic representation of an exemplary protrusion setting station in a load condition.
Figure 2B:
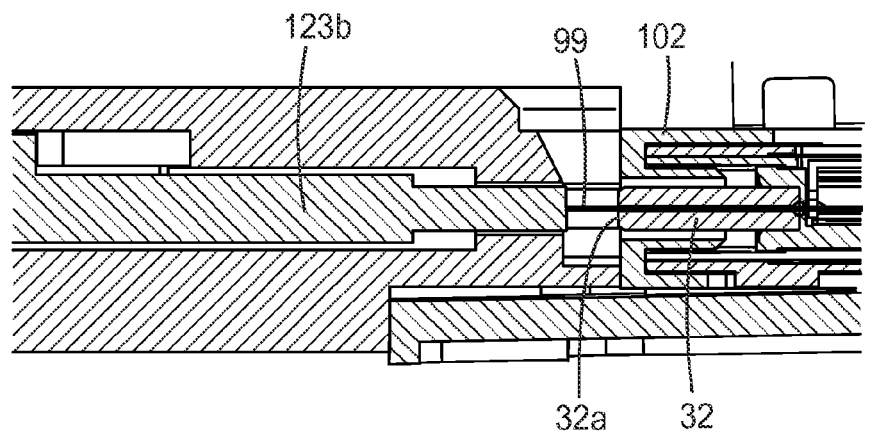
FIG. 2B shows a cross-section detail view of the protrusion setting jig of the protrusion setting station of FIG. 2A in a load condition.
Figure 2C:
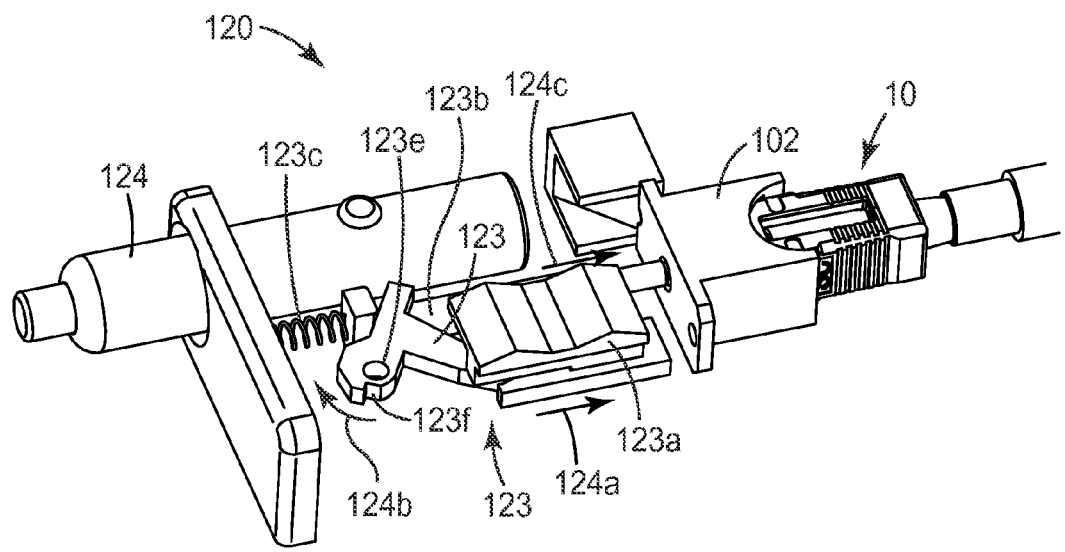
FIG. 2C shows a schematic representation of an exemplary protrusion setting station in a protrusion setting condition.
Figure 2D:
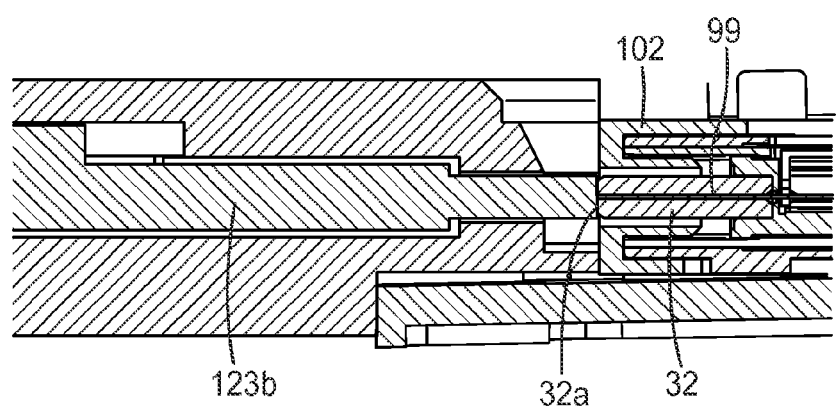
FIG. 2D shows a cross-section detail view of the protrusion setting jig of the protrusion setting station of FIG. 2A in a protrusion setting condition.
Figure 2E:
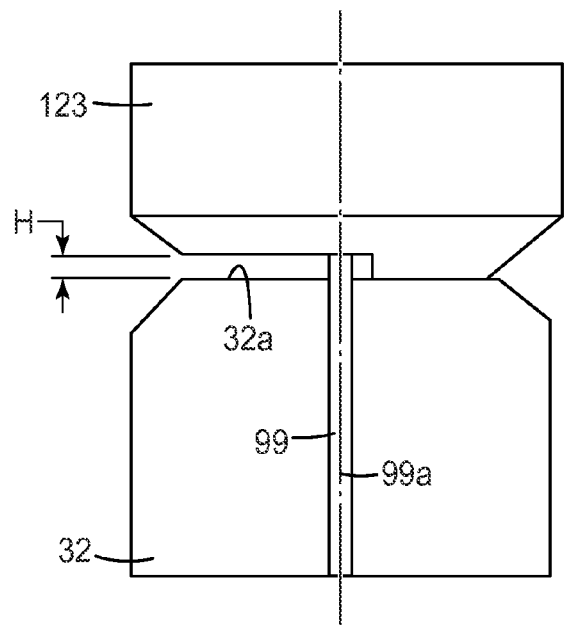
FIGS. 2E and 2F show a schematic cross section view of the end of two exemplary protrusion jigs that are used to set the fiber protrusion in a standard optical fiber connector and an angle polish optical fiber connector, respectively.
Figure 2F:
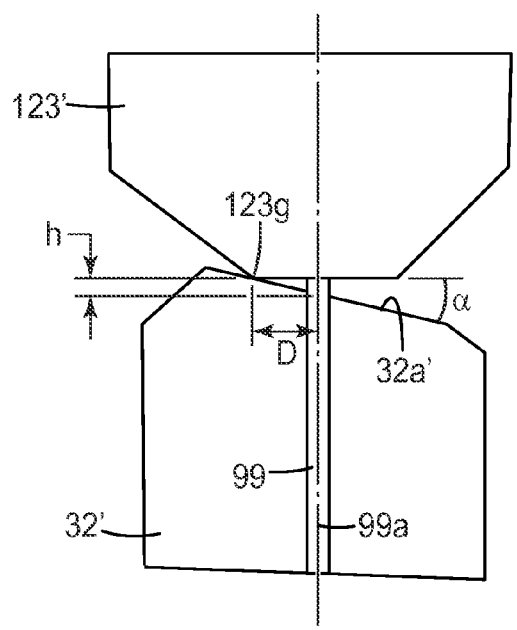
Figure 3:
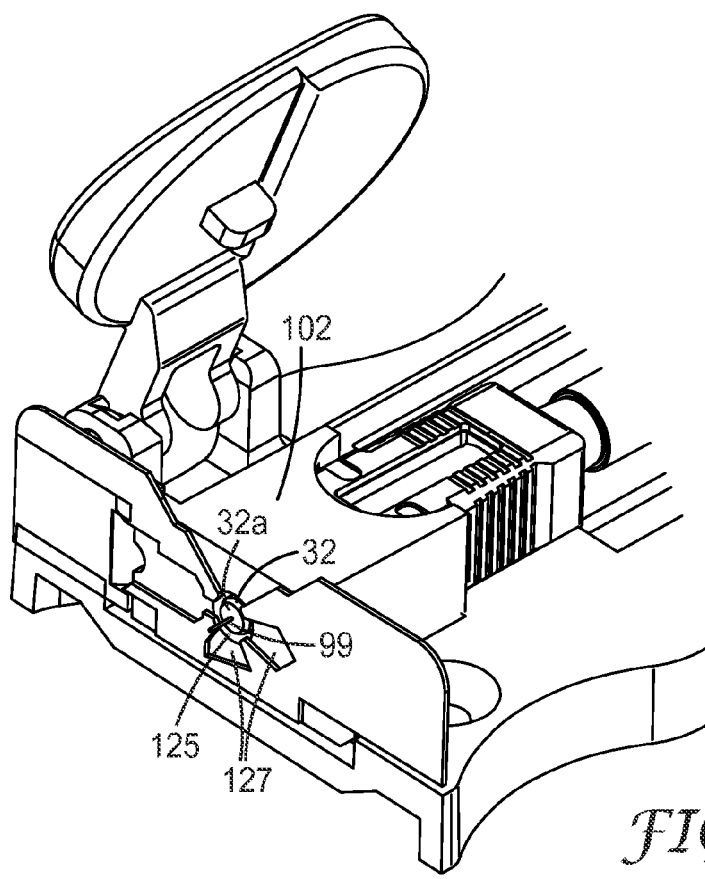
FIG. 3 shows a sectional detail view of the internal structure of the protrusion setting station.

An exemplary assembly tool 100 for installing an optical fiber in an optical connector is shown with respect to FIGS. 1-3. This assembly tool provides for repeatable, accurate fiber insertion into a remote grip optical fiber connector and allows the setting of a precise protrusion length of fiber from the end face of the ferrule to simplify the installation process and help ensure stable optical performance of the connector. Moreover, the exemplary assembly tool allows the field technician to utilize a fully assembled or nearly fully assembled optical fiber connector during termination to facilitate easier installation of remote grip optical connectors. The assembly tool can be made inexpensively to provide a low cost tool to the customer.

Assembly tool 100 includes a protrusion setting station 120 disposed on a base 110. The base 110 can include a guide channel 112, a drag finger 113 and a stop release lever 111 formed therein.

The protrusion setting station 120 enables the craftsman to reliably set a protrusion or protrusion length of a terminal end of the optical fiber 99 that extends from an end face 32a of the connector ferrule 32 (FIG. 3). The protrusion setting station 120 includes a housing 121, a window 122 within the housing 121 to view the terminal end of the optical fiber, a protrusion setting jig 123b, and a light source 124 to illuminate the terminal end of the optical fiber.

In an exemplary embodiment shown in FIGS. 2A and 2C, the protrusion setting jig 123b can be part of an activatable cam assembly 123. Specifically, FIGS. 2A and 2C show the protrusion setting station 120 of the exemplary assembly tool 100 with the housing 121 and the base removed so that the internal components of the protrusion setting station can be seen. FIG. 2A shows the protrusion setting station 120 in a load condition, i.e. in a retracted state or position so that the optical fiber 99 can be inserted into the optical connector 10. FIG. 2B shows a cross-section detail view of a protrusion setting jig 123b, which is part of the activatable cam assembly that will be described in more detail below, in a retracted state or position. FIG. 2C shows the protrusion setting station 120 in a protrusion setting condition and FIG. 2D shows a cross-section detail view of a protrusion setting jig 123b in a protrusion setting condition.

The cam assembly 123 can be disposed within the housing (not shown) and can include a switch, toggle or knob 123a which can be activated during installation of a optical fiber in a connector 10 to engage the protrusion setting jig 123b which controls the amount of fiber protruding from the end face 32a of the connector ferrule 32 after activation and a spring 123c to ensure an adequate contact force between the protrusion setting jig and the end face of the connector ferrule. The switch 123a can run in a track 121a (FIG. 1) in housing 121 to allow the cam assembly 123 to move from a retracted or load position to a forward activated or protrusion setting position.

FIG. 2E shows a schematic cross sectional view of the end of a protrusion setting jig 123b used to set the protrusion of an optical fiber 99 from a connector ferrule 32 for a standard optical fiber connector (i.e. when the end face 32a of the ferrule is perpendicular to the axis 99a of the optical fiber 99). The end of the protrusion setting jig has a stepped profile. The protrusion length of the fiber is determined by the height, H, of the step in the profile. In an exemplary embodiment, the height of this step can be in the range of about 20 microns to about 40 microns. With this initial protrusion set at this length, the terminal end of the optical fiber would protrude from the end face of the connector ferrule by about 14 microns to about 34 microns after final polishing the connector.

Alternatively, FIG. 2F shows a schematic cross sectional view of the end of a protrusion setting jig 123b' used to set the protrusion of an optical fiber 99 from an angled connector ferrule 32' for an angle polished optical fiber connector (APC, i.e. when the end face 32a' of the angled connector ferrule is inclined at some angle other than perpendicular with respect to the axis 99a of the optical fiber 99). In this exemplary aspect, the end of protrusion setting jig 123b' can be a truncated cone in shape. The angled connector ferrule 32' contacts the protrusion setting jig at a contact point 123g. The protrusion length, h, of the fiber is determined by the angle, α, of the end face 32a' of the angled connector ferrule 32' and the distance, D, of the contact point from the axis 99a of the optical fiber. Typical angled connector ferrules are angled from about 6° to about 10°, preferentially at about 8°.

When the switch 123a is moved from the load position to the protrusion setting position in direction 124a, linkage 123d rotates around pivot point 123e (as represented by arrow 124b). The spring 123c can then push a protrusion setting jig 123b forward until it contacts the end face 32a of the connector ferrule. When the protrusion setting jig 123b moves forward, it can push the terminal end of the optical fiber 99 back so that it protrudes from the end face of the connector ferrule by a predetermined amount. Optical fiber 99 can then be secured into the optical fiber connector 10 by activating the gripping element 42 (FIG. 4) within the optical fiber connector, which will be described more fully below. After the optical fiber has been secured in the connector, the cam assembly can be reset by sliding switch 123a in a direction opposite of the activation direction 124a. The switch will cause the linkage 123d to pull the protrusion setting jig 123b back until the switch contacts stop 123f on the linkage.

To facilitate the protrusion setting operation, the housing 121 of the protrusion setting station 120 can be designed with a cavity, such that the end face 32a of the connector ferrule 32 extends into the cavity 125 as shown in FIG. 3. For example, FIG. 3 is a sectional view of the protrusion setting station perpendicular to the connector ferrule 32 when it is installed in connector mount 102. A window 122 through the housing 121 (FIG. 1) allows visualization of the terminal end of the optical fiber 99 before and after the protrusion setting operation.

Window 122 can allow a range of viewing angles for visualizing the terminal end of an optical fiber protruding from the end face of an optical fiber connector ferrule. In the exemplary embodiment shown in FIGS. 1-3, window 122 is disposed directly above cavity 125. Thus, the terminal end of the protruding fiber is viewed at an angle of 90° relative to a plane established by the light path and the optical fiber. In an alternative embodiment as shown in FIGS. 6A-B and 7A-C terminal end of the protruding fiber is viewed at an angle of about 40° relative to a plane established by the light path and the optical fiber and the propagation direction of the light.

In a further exemplary aspect, one or more lenses (not shown) may be disposed in window 122 to magnify the protruding terminal end of the optical fiber.

To enhance the viewing of the terminal end of the optical fiber, a light source 124 may be provided. The light source may include reflected ambient or external light, a light emitting diode, or a small incandescent bulb such as that used in a miniature flashlight. In the exemplary embodiments shown in FIGS. 1-3, a miniature flashlight is used as the light source 124. For example, the light source 124 may be inserted into the housing 121 from the rear side of the protrusion setting station (i.e. the side opposite where the connector mount 102 is located as shown in FIG. 1). The light may be directed into cavity 125 along light path 126 by a mirror or other reflective surface 126a. Additional reflective surfaces may be used to guide the light from the light source to the cavity as required by the positioning of the light source with respect to the cavity.

Because an optical fiber is made of glass or other transparent media, it can be easier to see light reflecting off of the surface of the fiber or light that has been focused by the fiber rather than seeing the actual fiber itself. In order to view the reflected or focused light, the light from the light source needs to be managed and controlled. If the light from the light source is not managed, excess light can overwhelm the light being reflected by the terminal end of the optical fiber. If the amount of light entering the cavity and/or the reflections from the cavity walls are not controlled and managed, the uncontrolled light can be mistaken as the terminal end of the fiber or can mask the light reflected by the terminal end of the fiber. Having a restricted aperture 126b into cavity 125 can reduce the amount of light entering the cavity as well as partially collimating the light. In addition, one or more black body absorbers may be positioned adjacent to the cavity to capture any light passing directly through the cavity or stray reflected light that would impair visualization of the end of the optical fiber. Black body absorbers can be in the form of a black body cavity such as a light trap or in the form of an extended black body, i.e. a surface that has been made strongly absorbing through a coating and/or surface roughness, such as a felt, a microstructured surface or a surface coated with a light absorbing coating. In an exemplary aspect, one or more light traps 127 may be positioned adjacent to the cavity to capture any light passing directly through the cavity or stray reflected light that would impair visualization of the end of the optical fiber. A light trap 127 can take the form of a well where the well has walls that are angled to prevent any light reflected by the walls from reentering cavity 125. To further enhance the visualization of the end of the optical fiber, the walls of cavity 125 and light traps 127 can be dark in color (e.g. black). In addition, darkening or coloring the end face 32a of the optical fiber connector ferrule 32 black can further improve visualization of the end of the optical fiber by reducing or eliminating light reflected by the end face of the connector ferrule. Optionally, a lens (e.g. a rod lens, not shown) may be added between the light source and the cavity to focus the light on the terminal end of the fiber protruding from the end face of the optical connector ferrule.

Figure 4:
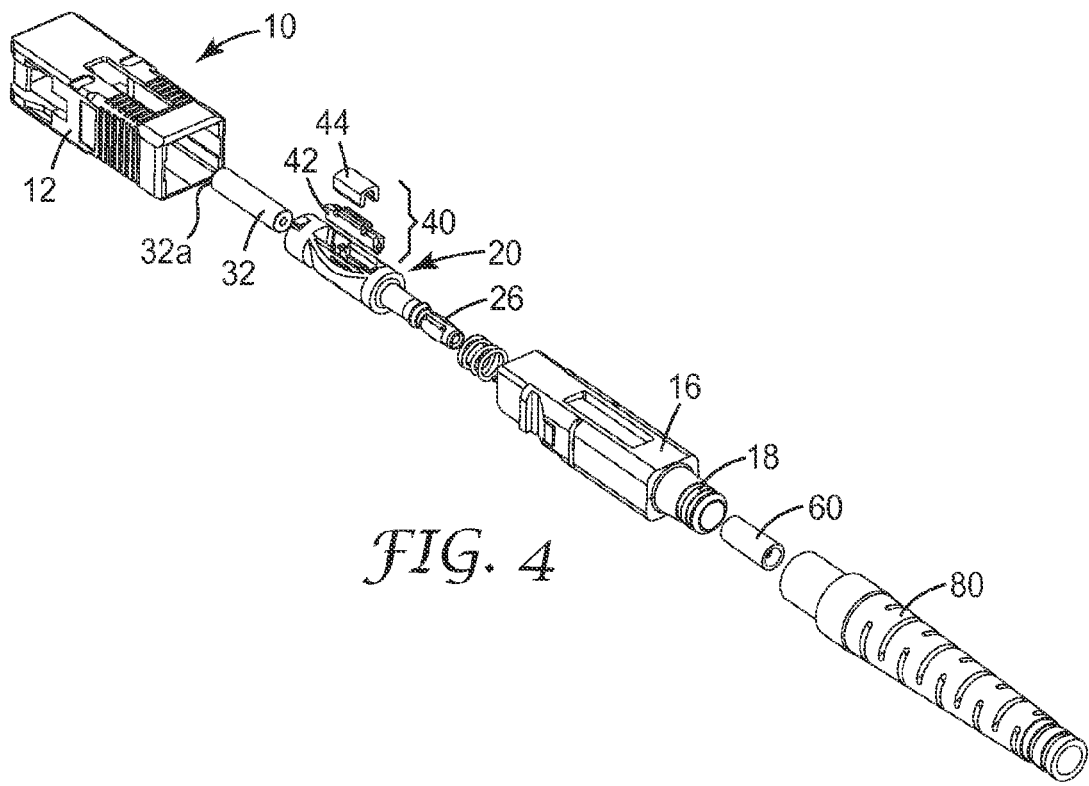
FIG. 4 shows an exploded view of an exemplary remote grip optical fiber connector.

The connector mount or holder 102 can be configured to receive and secure a remote grip optical fiber connector, such as connector 10, shown in FIG. 4, during the fiber termination procedure. For example, a conventional optical fiber connector 10 can include a remote grip connector. Such a connector is described in detail in US Patent Publication No. 2008-0226236, incorporated by reference herein in its entirety. In alternative aspects, the conventional connector 10 can include a Crimplok™ Connector available from 3M Company (St. Paul, Minn.). In an exemplary aspect, optical fiber connector 10 can have an SC format. In other aspects, the protrusion setting apparatus can be configured to receive a connector having another standard connector format, such as an LC format or an FC format. In a further alternative, the connector mount 102 can be configured to receive a connector having multiple fibers, such as an MT fiber connector.

Referring to FIG. 4, an exemplary optical fiber connector 10 can include a connector body having an outer shell 12 that is configured to be received in an SC receptacle (e.g., an SC coupling, an SC adapter, or an SC socket) and a fiber strain relief boot 80. A backbone 16 can be disposed inside the outer shell 12 and can provide structural support for the optical fiber connector 10. The backbone 16 further includes at least one access opening to provide access to actuate a gripping device disposed within the connector and a mounting structure 18 for attaching fiber strain relief boot 80 to the optical connector. Additionally, connector 10 includes a collar body 20 that is disposed within the connector/s outer shell and retained therein. The collar body 20 can house a gripping device 40 and a fiber buffer clamp 26. A sleeve 60 having an opening extending therethrough can be axially slid over the outer surface of buffer clamp 26 during installation of the connector onto an optical fiber to activate the buffer clamp. The gripping device 40 includes a gripping element 42 and an securing cap 44 and can be seated within collar body 20. In a preferred aspect, the gripping element 42 comprises a sheet of ductile material having a focus hinge that couples two legs, where each of the legs includes a fiber gripping channel to optimize clamping forces for a conventional glass optical fiber received therein. The ductile material, for example, can be aluminum or anodized aluminum. Securing cap 44 is preferably configured to engage the gripping element 42 such that the gripping element securely grabs a fiber inserted therein when the securing cap is fully actuated over the gripping element. In operation, the securing cap 44 is moved from an open position to a closed position when pressed down over the gripping element.

Structurally, a connector ferrule 32 may be secured in one end of collar body 20 by any known method (e.g. adhesive, snap fit, etc.). Connector ferrule 32 can be formed from a ceramic, glass, plastic, or metal material to support the optical fiber being inserted and terminated within the optical connector. In a first exemplary aspect, connector ferrule 32 is a ceramic ferrule. The optical fiber being terminated in the connector can comprise a standard single mode or multimode optical fiber.

The connector mount 102 may be attached to the base 110 of the assembly tool 100 by a mechanical fastener, such as screws or snap catches. Alternatively, the connector mount 102 may be connected to the assembly tool by an adhesive or other bonding technique, such as welding. The connector mount 102 can be preferentially attached to the base 110 by a releasable fastener to allow for connector mount replacement when a different connector format is used.

Assembly tool 100 can further include an actuation mechanism 140 that includes a cap actuator or driver 146 that is configured to contact and press against the securing cap of the connector, such as securing cap 44 of the remote grip optical fiber connector 10 (see FIG. 4). For example, a pressing movement can be applied to cap actuator or driver 146 to displace the driver towards the securing cap 44 until contact is made to actuate the gripping element.

In addition, assembly tool 100 includes a fiber holder assembly 170 having a fiber holder assembly base 172. In a preferred aspect of this embodiment, the fiber holder assembly base 172 is configured to be slidably received in guide channel 112 of the assembly tool base 110. According to an exemplary aspect of this embodiment, assembly tool base 110, fiber holder assembly 170, and components thereof, can be formed or molded from a polymer material.

As shown in FIG. 1, fiber holder assembly 170 includes fiber clamps 192a, 192b, and 192c. The clamping portions are provided to support and temporarily secure an optical fiber during the termination process. Each clamping portion can include one or more aligned fiber guides or channels to provide more axial support of the fiber along a substantial distance of the assembly tool. For example, fiber guides or channels 191a-e can be provided. Each of the fiber clamps 192a-c can include a lid which is pivotally attached to the fiber holder assembly base 172 and can be latched to provide the desired holding force. The fiber clamps 192a-c can utilize the same or different clamping mechanisms depending on the amount of clamping force desired. Commonly owned U.S. Pat. No. 7,280,733, incorporated herein by reference in its entirety, describes a fiber termination platform having a similar fiber holder assembly device to guide and hold an optical fiber during insertion of the fiber into a fully assembled optical connector.

In this exemplary embodiment, the fiber clamp 192a is formed as part of a buffer clamp actuator 180. The buffer clamp actuator 180 also includes a funnel-shaped fiber guide (or funnel) 182 that can both guide a fiber and actuate a buffer clamp mechanism of connector 10 held in connector mount 102.

The base 110 further includes stops 117 that are configured to stop the forward sliding motion of buffer clamp actuator 180, for example, by contacting buffer clamp handles or lobes 186a and 186b. Stops 117 can further be configured to slightly overhang guide channel 112 to help prevent the fiber holder assembly base 172 from rising out of guide channel 112 during fiber bowing.

Buffer clamp actuator 180 is configured to engage or otherwise actuate a buffer clamp sleeve, such as sleeve 60 (see FIG. 4). For example, buffer clamp actuator 180 can include funnel-shaped fiber guide 182 and a tip portion 181 configured to contact sleeve 60, or a portion thereof. The funnel-shaped portion provides a guide for a fiber to be inserted therethrough. Buffer clamp actuator 180 can further include handles or lobes 186a and 186b that provide accessible contact points for a user to slide the buffer clamp actuator during fiber termination.

As mentioned above, assembly tool 100 includes a base 110 having a drag finger 113 and a stop release lever 111 formed therein. Drag finger 113 can be formed as a protrusion such that when fiber holder assembly base 172 is slidably placed within guide channel 112, drag finger 113 can engage with or press against the side of fiber holder assembly base 172 to temporarily hold fiber holder assembly base 172 in place, such as to prevent axial movement of the fiber holder assembly base 172 as a fiber being terminated begins bowing.

Stop release lever 111 can also be formed in base 110 to provide an interlocking feature so that the buffer clamp of the connector, e.g., sleeve 60, is not prematurely actuated by buffer clamp actuator 180. For example, near the end of its track, the buffer clamp actuator 180 subassembly can be prevented from further movement until the stop release lever 111 is activated. In this exemplary embodiment, the stop release lever 111 can be formed as a push mechanism having an arm that engages one of the buffer clamp handles or lobes 186a and 186b until the push mechanism is triggered by the user, thus displacing the arm to disengage with the buffer clamp handle or lobe.

In practice, a fiber termination process can utilize the assembly tool 100 to terminate an optical fiber in the field to an optical connector 10 in a straightforward manner. In addition, the field technician can utilize an optical connector that is fully assembled or nearly fully assembled in the factory, such that additional connector assembly is not necessary in the field. FIG. 4 shows an exploded view of an optical connector that can be partially assembled in the factory into an assembled connector portion including the outer shell 12, the backbone 16, the collar body 20, the gripping device 40 and sleeve 60 and a separate strain relief boot 80.

To install a partially assembled remote grip connector onto an optical fiber, the strain relief boot 80 should be threaded onto the optical fiber. A partially assembled connector 10 can be installed in connector coupling or connector mount 102, e.g., by a snap fit.

An optical fiber, such as optical fiber cable can be prepared by stripping and cleaving (flat or angled) to expose the terminal end of the optical fiber 99. Optical fiber can be prepared prior to insertion in the fiber holder assembly 170 or after insertion in the fiber holder assembly 170. The fiber jacket/plastic coating can be stripped using a conventional mechanical fiber stripper. A small amount of plastic coating can extend beyond the end of fiber holder assembly 170. The glass portion of the fiber can be wiped clean. Cleaving, using a conventional cleaver, such as described above, can be performed as the fiber is held in place in the fiber clamp assembly.

Prior to actuation, the buffer clamp actuator 180 can be positioned at the front end of the fiber holder assembly 170. The optical fiber being terminated, such as optical fiber 99, can be installed in the fiber holder assembly by laying the fiber in funnel-shaped fiber guide 182 of buffer clamp actuator 180 and on top of fiber guides 191*a-e* such that the end of the fiber extends to or slightly beyond tip portion 181. Optical fiber 99 can be held in place by engaging fiber clamps 192*a-c* by placing one or more of the fiber clamps in a closed position. The fiber holder portions can be configured to clamp a standard optical fiber outer jacket, such as a conventional fiber having 900 μm buffer sleeve or a 250 μm buffer sleeve.

With the switch 123*a* of the protrusion setting device 100 set to the load position, the fiber holder assembly 170, with the prepared fiber held therein, can be inserted in guide channel 112 of the assembly tool base 110. The fiber holder assembly can be moved forward (i.e., towards the mounted connector) by applying modest force to fiber holder assembly base 172. The fiber holder assembly base 172 and buffer clamp actuator 180 move together along guide channel 112 until the stop release lever 111, is engaged by at least one of the handles or lobes 186*a* and 186*b*. This engagement of the buffer clamp actuator 180 stops the funnel tip portion 181 from further movement until the stop release lever 111 is disengaged by the user. The fiber assembly holder base 172 can continue to be slid in guide channel 112 until the terminal end of optical fiber 99 extends beyond the connector ferrule end face 32*a* by a distance of about 0.5 mm to about 1.5 mm. The position of the terminal end of the optical fiber can be illuminated and viewed through window 122 to ensure that the fiber was properly inserted through the optical connector.

The protrusion setting device can be engaged by moving switch 123*a* from the load position to the protrusion setting position in direction 124*a*. This action can cause linkage 123*d* to rotate around pivot point 123*e* (as represented by arrow 124*b*) and the protrusion setting jig 123*b* to move forward until it contacts the end face 32*a* of the connector ferrule. After the protrusion setting device has been activated, the cap actuator or driver 146 can then be pressed against the securing cap 44 of the connector to actuate the gripping element 42 in optical connector 10. The protrusion setting device can be deactivated so that the terminal end of the optical fiber can be viewed through window 122. Alternatively, the terminal end of the fiber can be viewed through window 122 to visually verify the fiber protrusion. The cap actuator or driver 146 can then be pressed against the securing cap 44 of the connector to actuate the gripping element 42 in optical connector 10.

The stop release lever 111 can then be pressed to allow the buffer clamp actuator 180, especially tip portion 181, to move further forward toward the connector. The funnel tip portion 181 can be pushed fully forward to slide sleeve 60 over the outer surface of buffer clamp 26 to activate the buffer clamp. The fiber clamps can be opened and the partially assembled connector 10 can be removed from the connector mount 102. Installation of the connector is complete when strain relief boot 80 is slid over mounting structure 18.

Thus, as is understood in view of the description above, the assembly tool of the alternative embodiment can accommodate a wider range of fibers and fiber stiffness, such as 250 μm coating, 900 μm soft PVC coating, 900 μm rigid nylon coating, etc. The assembly tool allows suitable insertion of the fiber into the connector, setting of a known fiber protrusion length, activation of the gripping element within the connector and securing of the buffer clamp if appropriate to the back end of the optical connector. After the connector has been installed on the optical fiber, the connector can be released from the assembly tool.

FIGS. 5A-5D show a second exemplary assembly tool 200 for installing an optical fiber in an optical connector. Assembly tool 200 includes a protrusion setting station 220 disposed on a base 210. The base 210 remains essentially the same as base 110 as was previously described.

Figure 5A:
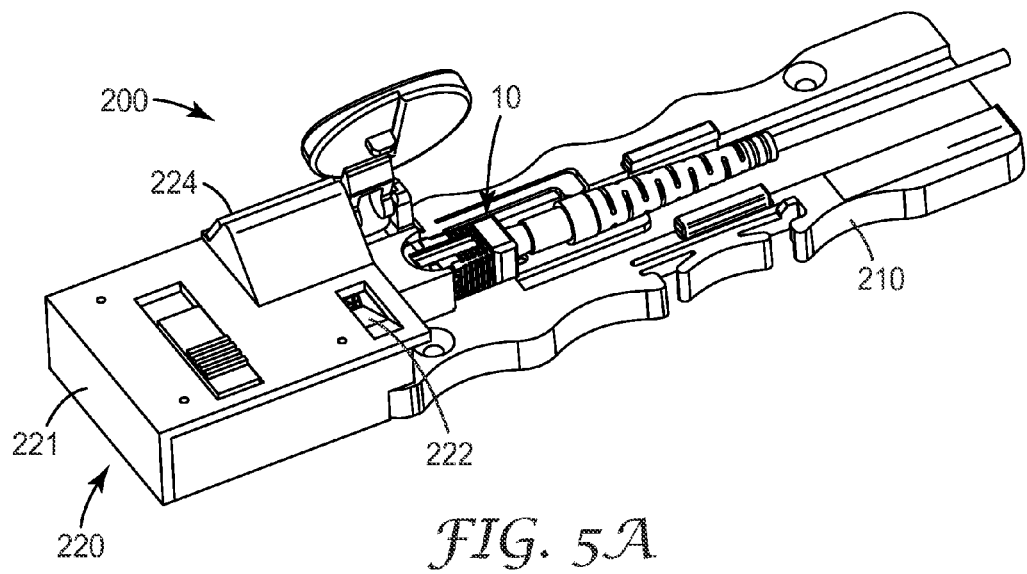
FIGS. 5A-D show four views of a second embodiment of an exemplary assembly tool according to the current invention.
Figure 5B:
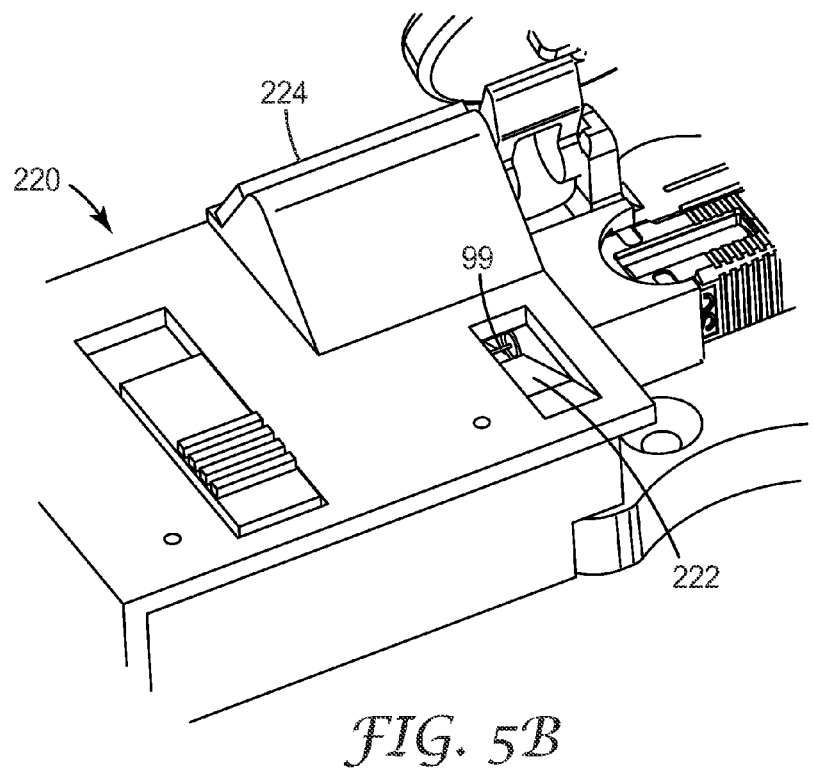
Figure 5C:
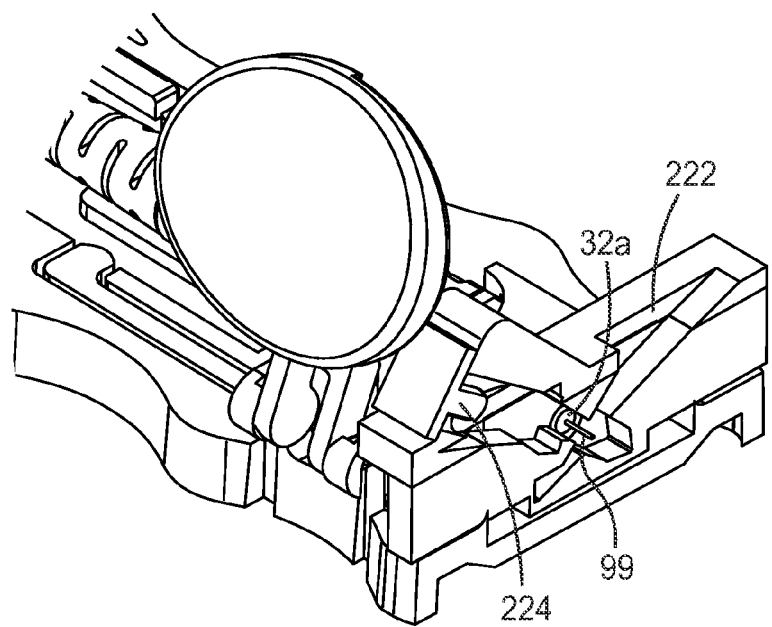
Figure 5D:
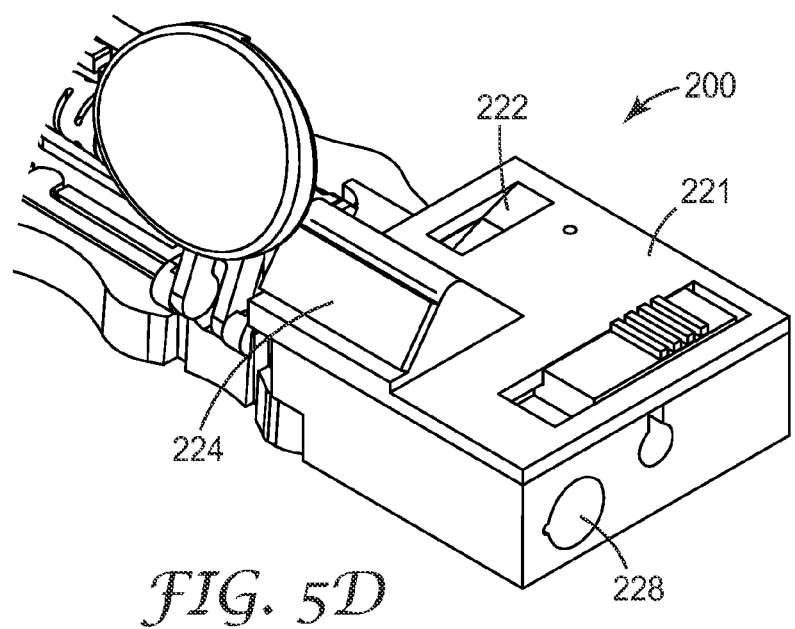

The protrusion setting station 220 includes a housing 221, a window 222 within the housing to view the terminal end of the optical fiber, a protrusion setting device, and a light source 224 to illuminate the terminal end of the optical fiber. In the exemplary embodiment shown in FIGS. 5A-5D, the light source 224 is a light emitting diode (LED). As shown in FIG. 5C, the light from the LED shines directly on the terminal end of optical fiber 99 when the end of the fiber is positioned in cavity within housing 221.

A power source or battery (not shown) to power the LED may be disposed in a battery chamber 228 within the housing 221 of the protrusion setting station 220.

Figure 6B:
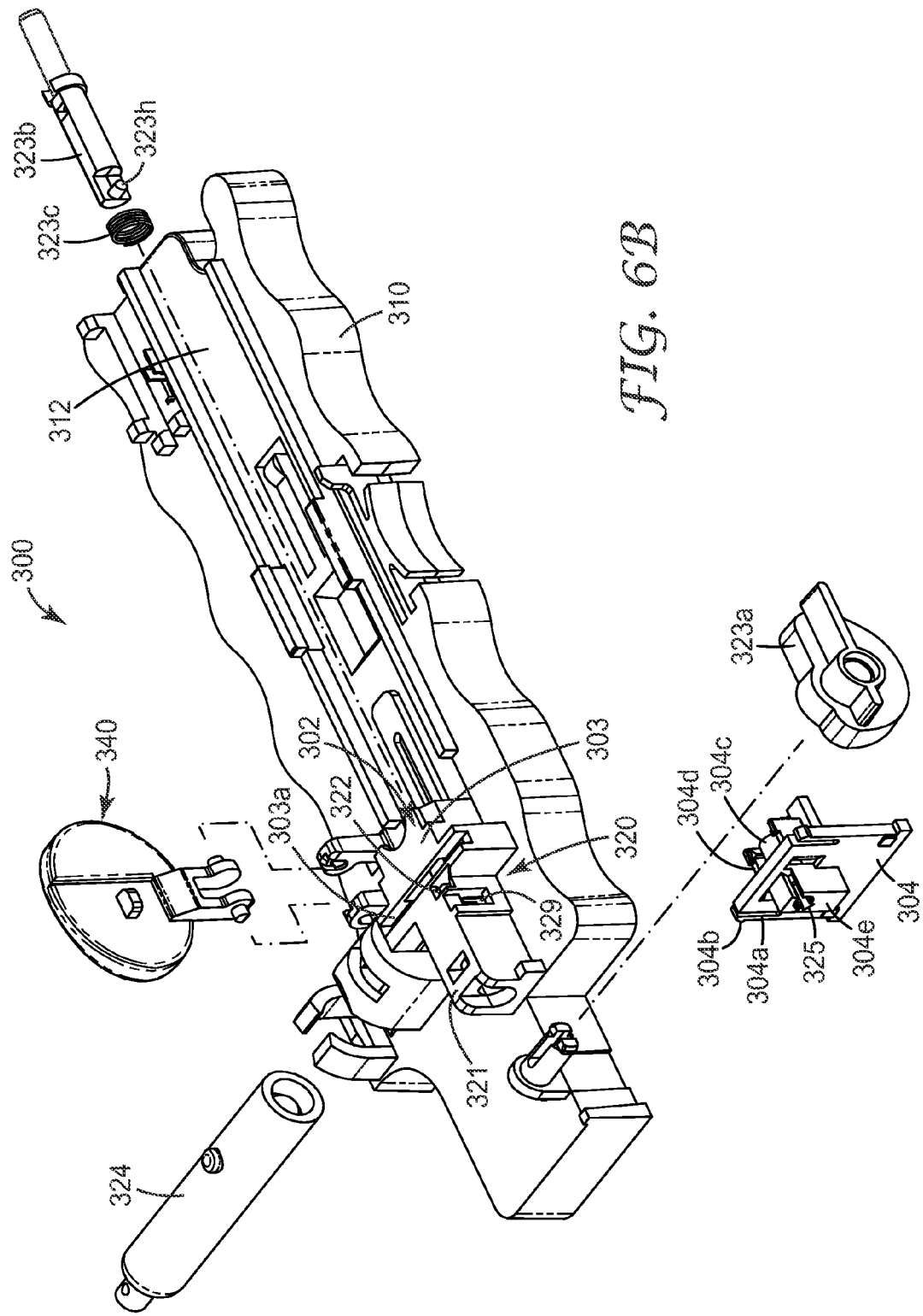
FIG. 6B shows an exploded view of the exemplary assembly tool of FIG. 6A.

An alternative exemplary assembly tool 300 for installing an optical fiber in an optical connector is shown with respect to FIGS. 6A and 6B. Assembly tool 300 includes a protrusion setting station 320 disposed on a base 310. The base 310 can include a guide channel 312 and a stop release lever 311 formed therein. Additionally, the base can have a lock 313 located in the bottom of the guide channel to retain the fiber holder assembly within the guide channel during the installation of the optical fiber into the optical connector regardless of the orientation of the assembly tool.

The protrusion setting station 320 enables the craftsman to reliably set a protrusion or protrusion length of a terminal end of the optical fiber that extends from an end face of the connector ferrule. The protrusion setting station 320 includes a housing 321, a window 322 within the housing 321 to view the terminal end of the optical fiber, a protrusion setting device, and a light source 324 to illuminate the terminal end of the optical fiber.

Figure 7A:
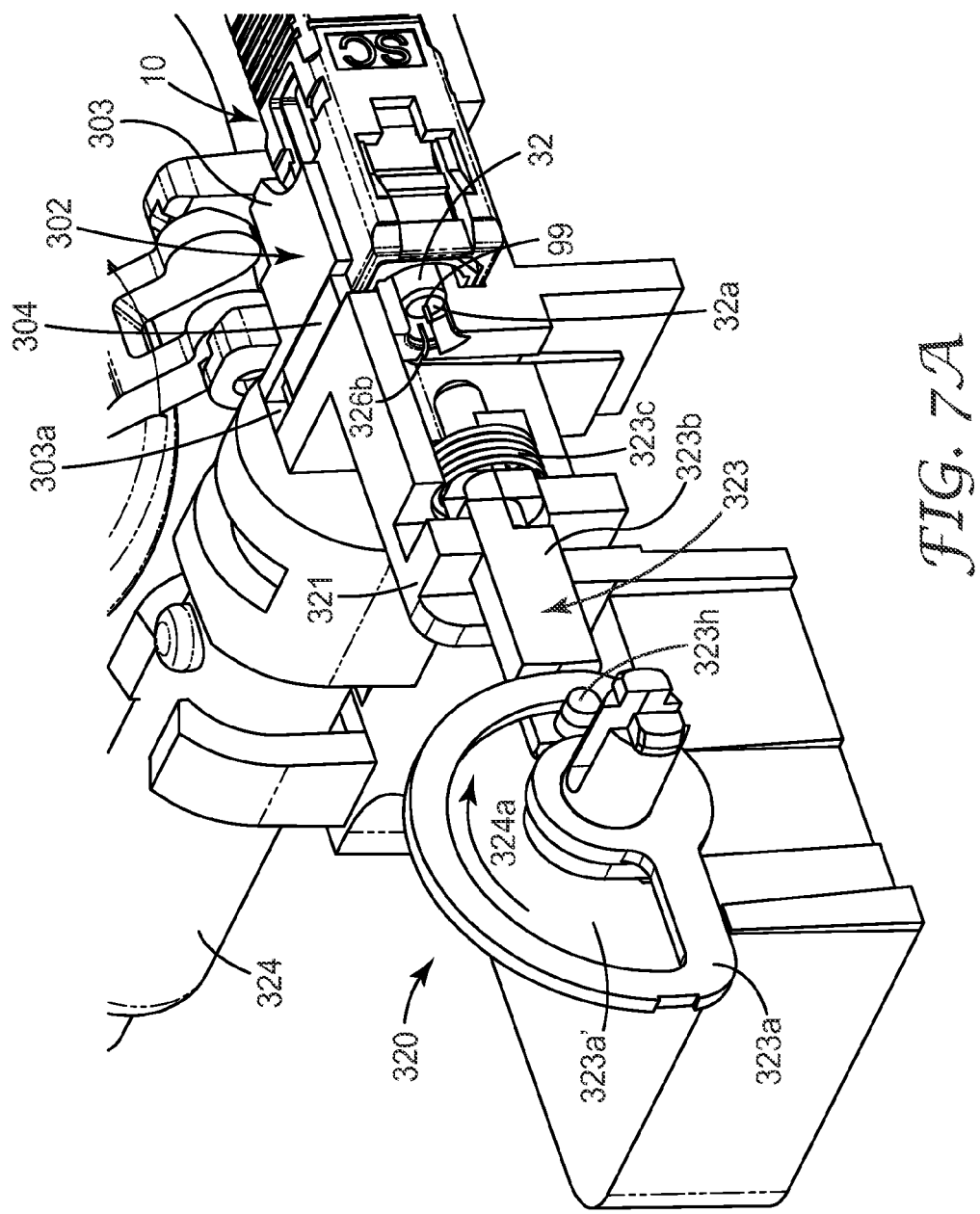
FIGS. 7A-C are sectional views of the exemplary assembly tool of FIG. 6A.
Figure 7B:
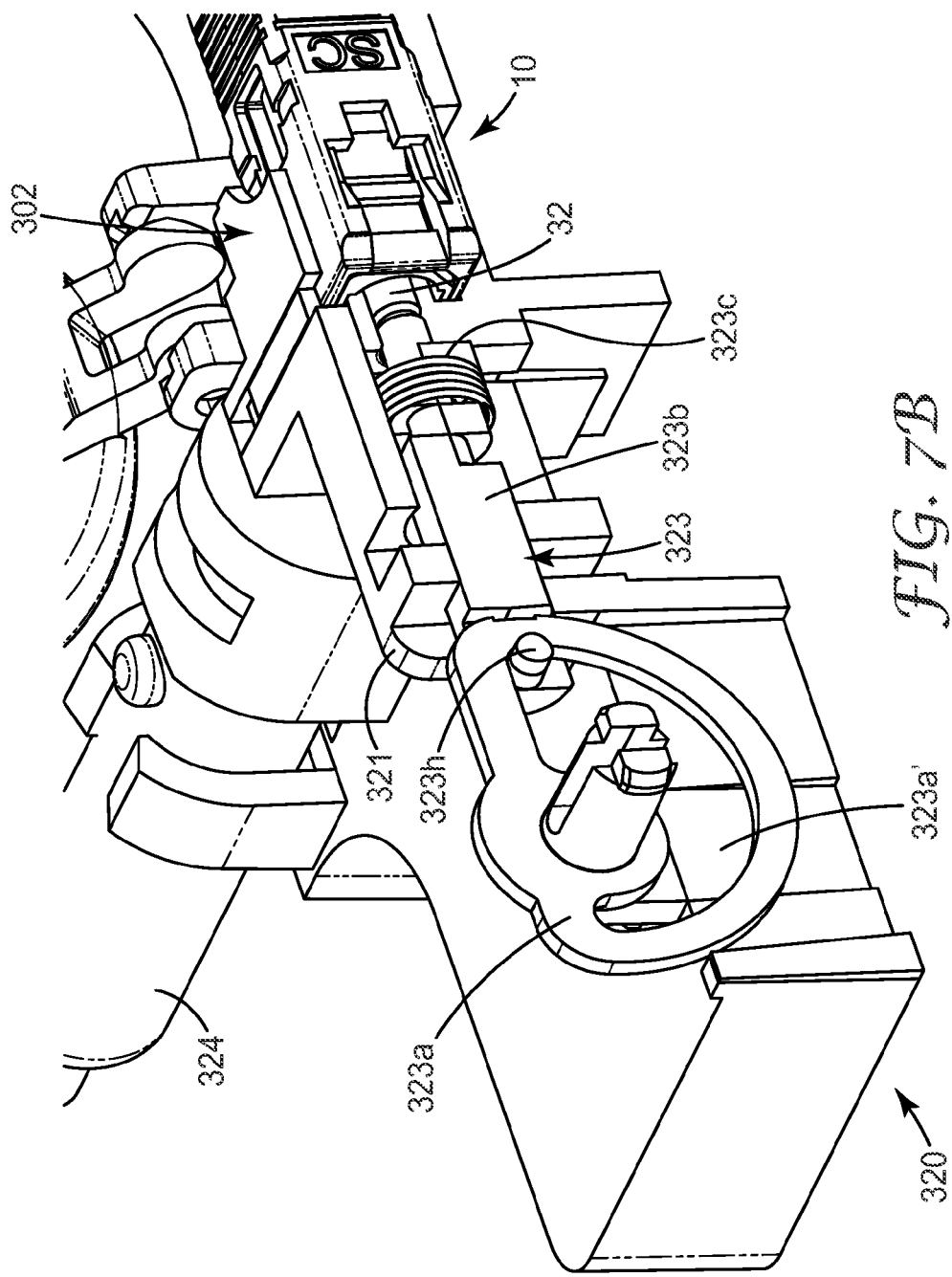

In an exemplary embodiment shown in FIGS. 6A, 6B, 7A and 7B, the protrusion setting jig 323*b* can be an activatable cam assembly 323. Specifically, FIGS. 7A and 7B show sectional views of the protrusion setting station 320 of the exemplary assembly tool 300 so that the internal components of the protrusion setting station can be seen. FIG. 7A shows the protrusion setting station 320 in a load condition, i.e. in a retracted state or position so that the optical fiber 99 can be inserted into the optical connector 10. FIG. 7B shows the protrusion setting station 320 in a protrusion setting condition.

The cam assembly 323 can be disposed within the housing (not shown) and can include a knob 323*a* which can be activated during installation of a optical fiber in a connector 10 to engage the protrusion setting device, a protrusion setting jig 323b which controls the amount of protruding fiber from the end face 32a of the connector ferrule 32 after activation and a spring 323c to ensure an adequate contact force between the protrusion setting jig and the end face of the connector ferrule. The knob 323a can have an arc shaped groove 323a' formed in a surface thereof. A pin 323h on the rear end of the protrusion setting jig engages with the arc shaped groove to allow the cam assembly 323 to move from a retracted or load position, shown in FIG. 7A, to a forward activated or protrusion setting position, shown in FIG. 7B. The end of a protrusion setting jig 323b used to set the protrusion of an optical fiber 99 from a connector ferrule 32 for a standard optical fiber connector can be similar in structure to that shown in FIGS. 2E and 2F as described previously.

When the knob 323a is moved from the load position to the protrusion setting position in direction 324a, pin 323h slides in the arc shaped groove 323a'. The spring 323c can then push a protrusion setting jig 323b forward until it contacts the end face 32a of the connector ferrule. When the protrusion setting jig 323b moves forward, it can push back the terminal end of the optical fiber 99 that has been inserted through the optical connector 10 so that it protrudes from the end face of the connector ferrule by a predetermined amount. Optical fiber 99 can then be secured into the optical fiber connector 10 by activating the gripping element within the optical fiber connector. After the optical fiber has been secured in the connector, the cam assembly 323 can be reset by turning knob 323a in a direction opposite of the activation direction 324a resulting in the protrusion setting jig 323b to be pulled back into its original position.

Figure 7C:
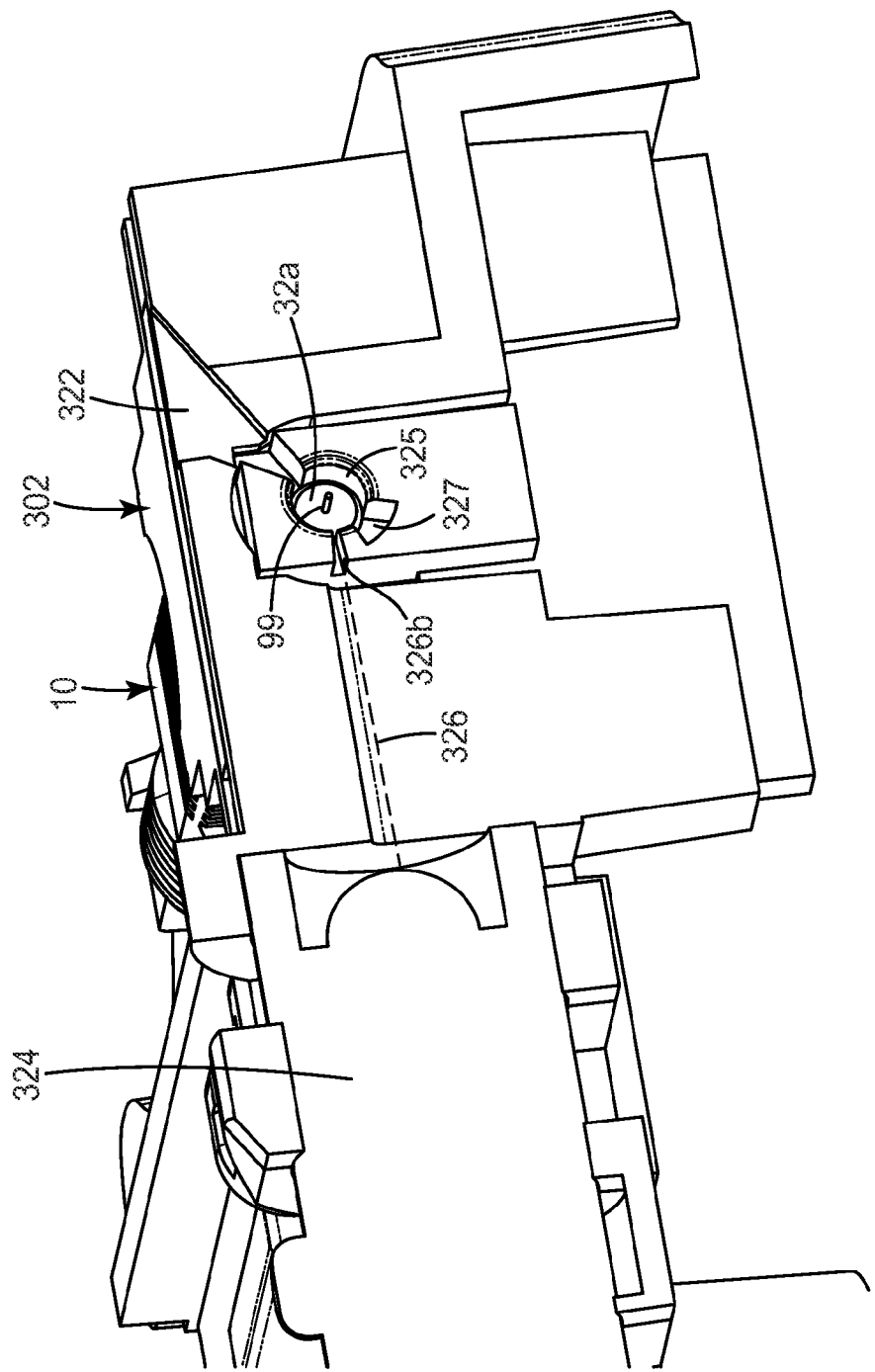

To facilitate the protrusion setting operation, the housing 321 of the protrusion setting station 320 can be designed with a cavity 325, such that the end face 32a of the connector ferrule extends into cavity 325 as shown in FIG. 7C. For example, FIG. 7C is a sectional view of the protrusion setting station perpendicular the connector ferrule when it is installed in connector mount. A window 322 through the housing 321 allows visualization of the terminal end of the optical fiber 99 before and after the protrusion setting operation. The window 322, shown in FIG. 7, is disposed above and to the side of cavity 325. Thus, the terminal end of the protruding fiber is viewed at an angle of about 40° relative to a plane established by the light path and the optical fiber.

To enhance the viewing of the terminal end of the optical fiber, a light source 324 may be provided. In the exemplary embodiments shown in FIGS. 6A-B and 7A-C, a light emitting diode (LED) flashlight is used as the light source 324. For example, the light source 324 may be inserted into the housing 321 from the side of the protrusion setting station. The light may be directed into cavity 325 along a propagation path 326 of the light and through an aperture 326b to control the amount of light entering cavity 325.

In the exemplary aspect in FIGS. 6A-B and 7A-C, the end of the optical fiber extending from the end face of the connector ferrule acts as a lens to focus and redirect the light when the fiber is inserted into a propagation path 326 of the light. A portion of the light can be redirected at a vertical angle of about 30° to about 60° relative to the propagation path of the light. Window 322 can be located to view this focused, redirected light. In the exemplary aspect shown in FIG. 7C, the window may be disposed at an angle of about 40° relative to the propagation path of the light and above the a plane established by the propagation path and the optical fiber.

In order to view the terminal end of the optical fiber, the light from the light source needs to be managed and controlled. If the light from the light source is not managed, excess light can overwhelm the light being focused by the terminal end of the optical fiber. If the amount of light entering the cavity and/or the reflections from the cavity walls are not controlled and managed, the uncontrolled light can be mistakenly taken as the terminal end of the fiber or can mask the light focused by the terminal end of the fiber. Using a restricted aperture 326b into cavity 325 can reduce the amount of light entering the cavity as well partially collimating the light which helps avoid this phenomenon. In addition, one or more light traps 327 (FIG. 7C) may be positioned adjacent to the cavity to capture any reflected light that would impair visualization of the end of the optical fiber. In addition, making the interior surfaces of the cavity and light traps a dark color and/or having a matte finish can further enhance the visualization of the end of the optical fiber.

The connector mount or holder 302 can be configured to receive and secure a remote grip optical fiber connector, such as connector 10, shown in FIG. 4, during the fiber termination procedure. In the exemplary embodiment shown in FIGS. 6A-B and 7A-C, connector mount 302 includes a casing 303 and an interchangeable connector plate 304. The connector plate is insertable into a slot 303a in casing 303. Connector plate 304 includes a pair of resilient side arms 304a each having a barb 304b at their free end to engage with the edge of slot 303a in casing 303, a connector receptacle to latch a given format optical connector in connector mount 302, and a ferrule alignment sleeve 304c to precisely position the connector ferrule in assembly tool 300. In the exemplary aspect shown in FIG. 6B, connector plate 304 can include a cavity structure 304e, which includes cavity 325, on the opposite surface of the connector plate and aligned with ferrule alignment sleeve 304c. Advantageously, having a connector mount with an interchangeable connector plate 304 allows the same assembly tool to be used with a variety of optical connector formats (i.e. ST, SC, FC, LC, etc.) by simply removing the interchangeable connector plate for one connector format and replacing it with a interchangeable connector plate configured for a different style of optical connector. In an exemplary aspect, the interchangeable connector plate 304 may be inserted into slot 303a from the bottom side of the assembly tool. An optional curtain (not shown) may be positioned over slot 303a on the bottom side of the assembly tool to block any ambient light from entering cavity 325 which would decrease the viewing efficiency of the tool. The connector mount 302 may be a separate sub-assembly or casing 303 may be integrally formed with housing 321 as shown in FIG. 6A.

Assembly tool 300 can further include an actuation mechanism 340 similar to the previously described actuation mechanism 140 (FIG. 1). Additionally, assembly tool 300 can include a cleaning window 329 to clean the end of the protrusion setting jig prior to installing an optical connector on an optical fiber cable. A cleaning swab (not shown) may be inserted through cleaning window 329 to remove any dust or grime from the end of the protrusion setting jig prior to connector installation.

Figure 8:
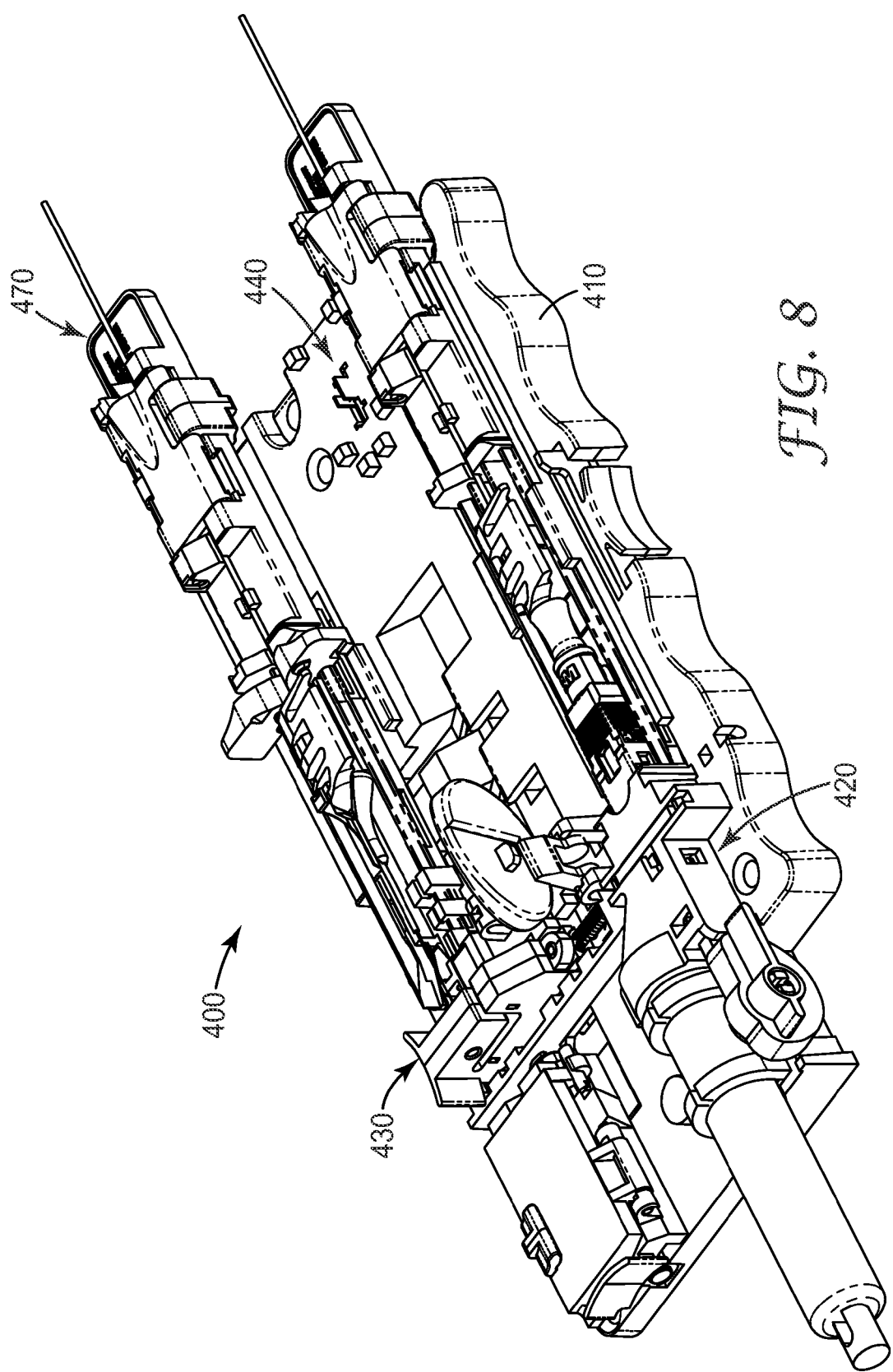
FIG. 8 shows an isometric view of an exemplary fiber termination platform according to the current invention.

In a further alternative exemplary fiber termination platform 400 for installing an optical fiber in an optical connector can include a plurality of installation devices as shown in FIG. 8. Fiber termination platform 400 can include a protrusion setting device 420, as described above, and a fiber cleaving device 430 disposed on a base platform 410. The fiber cleaving device can be similar to the fiber cleaver described in Patent Application No. 61/170,152, incorporated by reference herein in its entirety. Both the fiber cleaving device 430 and the fiber protrusion device 420 can be used in conjunction with fiber holder assembly 470 to facilitate handling of the optical fiber during connector installation. In addition, a connector deactivation station 440 could be added which would facilitate the removal of the connector from the optical fiber so that the connector can be reworked if necessary.

Another exemplary assembly tool 500 for installing an optical fiber in an optical connector is shown with respect to FIGS. 9-11E. This assembly tool provides for repeatable, accurate fiber insertion into a remote grip optical fiber connector. The assembly tool can be used to set a precise protrusion length of fiber from the end face of the ferrule to simplify the installation process and to help ensure stable optical performance of the connector. In addition, assembly tool 500 includes an improved fiber holder, that prevents 250 µm and 900 µm coated optical fiber from buckling while being inserted into the connector. Assembly tool 500 has also been configured so that only a single action is needed to set the protrusion and actuate the cap on the optical connector.

Assembly tool 500 includes a protrusion setting station 520 (shown in 11C) disposed on a base 510. This base can have features that are similar to the features of previously described bases 110, 210, 310, 410. Connector mount 502 is disposed adjacent to protrusion setting station 520 such that the end face of the ferrule of an optical fiber connector 10 inserted into the connector mount will be properly positioned within the protrusion setting station to allow viewing of the end of the optical fiber as it is inserted through the optical connector. The connector mount 502 may be attached to the base 510 of the assembly tool 500 by a mechanical fastener, such as screws or snap catches, by an adhesive or other bonding technique, such as welding or may be integrally formed with the housing 521 of the protrusion setting station 520.

The protrusion setting station 520 enables the craftsman to reliably set a protrusion or protrusion length of the terminal end of the optical fiber that extends from an end face of the connector ferrule, as described previously. The protrusion setting station 520 includes a housing 521, a window 522 within the housing 521 to view the terminal end of the optical fiber, a protrusion setting jig 523b, an actuation lever 540, and a light source 524 to illuminate the terminal end of the optical fiber. The elements of the protrusion setting station 520 and protrusion setting jig 523b of assembly 500 are similar those of the tool shown in FIGS. 7A and 7B.

The actuation lever 540 allows for the sequential setting of the protrusion length of the optical fiber from the end of the optical connector ferrule followed by positioning of the securing cap 44 of the optical connector 10 which secures the optical fiber 99 in place within the optical connector.

The actuation lever is pivotally attached to the base 510 of assembly tool 500. The actuation lever 540 that includes an arc shaped groove 543 (FIG. 11D) to accept a pin on the rear end of the protrusion setting jig 523b and a cap actuator or driver 546 that is configured to contact and press against the securing cap of the connector, such as securing cap 44 of the remote grip optical fiber connector 10. The pin on the rear end of the protrusion setting jig 523 within the protrusion setting station 520 engages with the arc shaped groove at the base of actuation lever 540 to allow the protrusion setting jig 523b to move from a retracted or load position, shown in FIG. 11C, to a forward activated or protrusion setting position, shown in FIG. 11E when the actuation lever is moved in a direction shown by arrow 525. Continuing the movement of the actuation lever brings the driver 546 in contact with the cap and applies a force to push the securing cap 44 over the gripping element (not shown) within optical connector 10 as shown in FIG. 11F.

Figure 9:
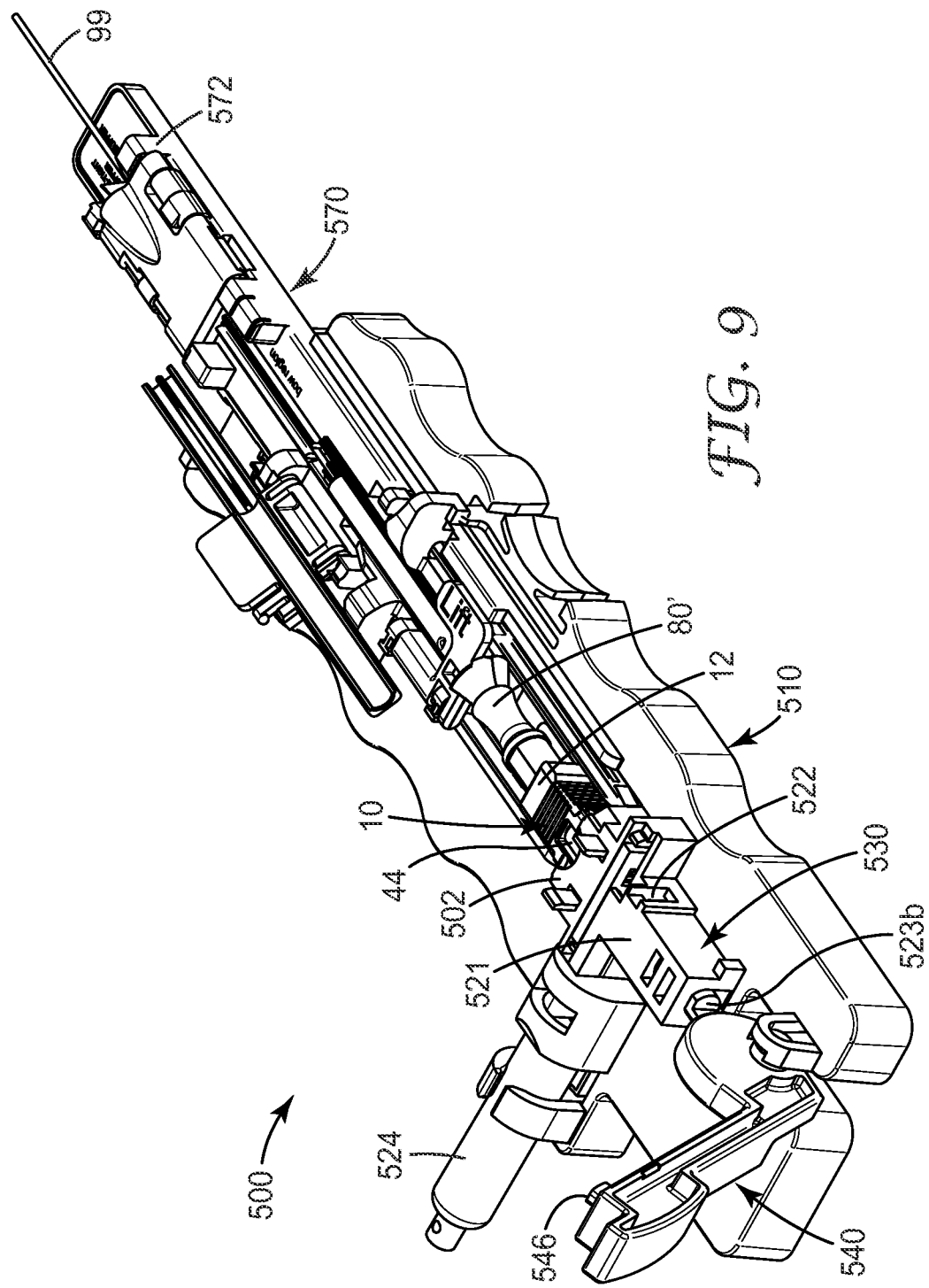
FIG. 9 shows an isometric view of an assembly tool according to another exemplary embodiment of the present invention.
Figure 10:
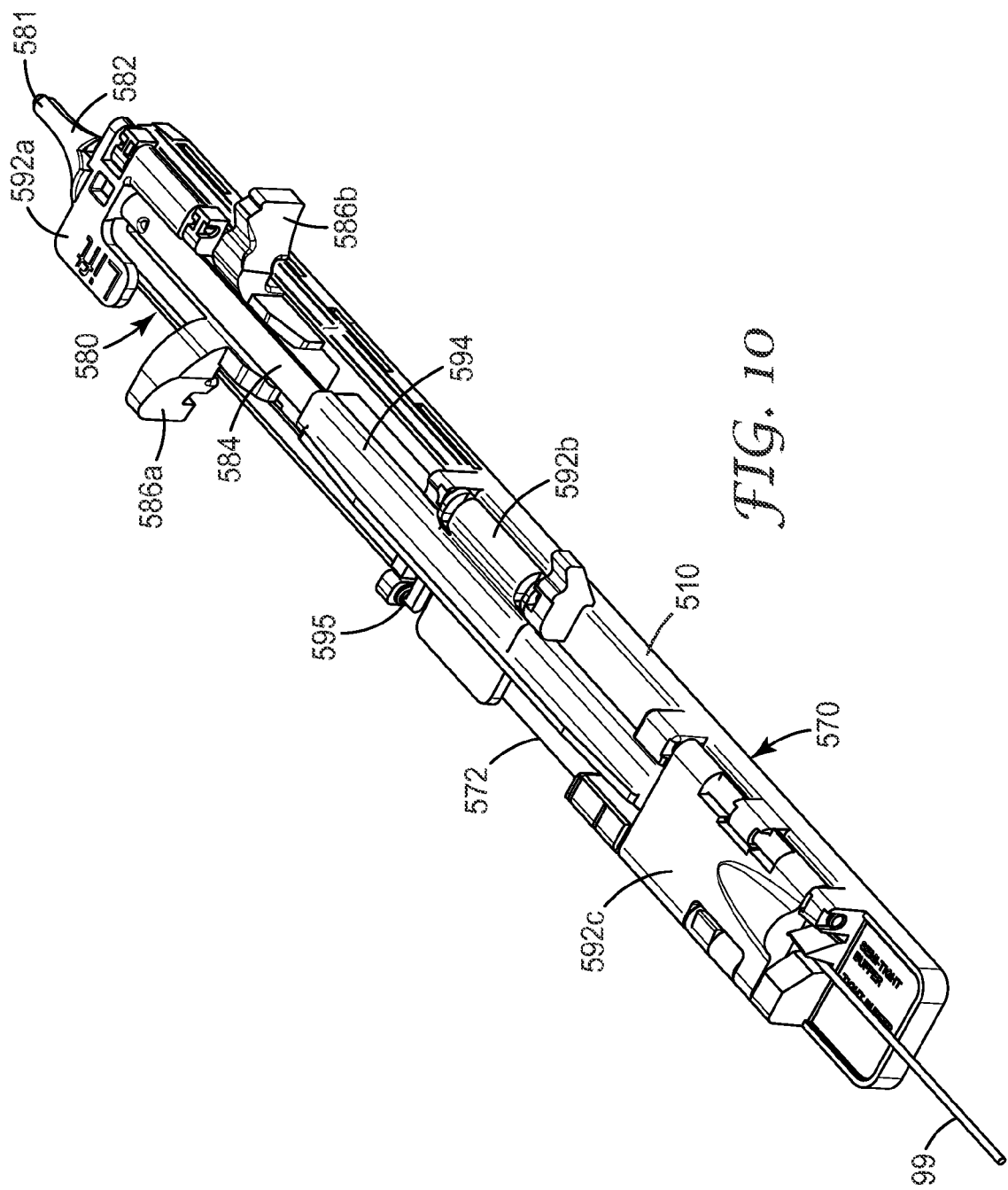
FIG. 10 shows an isometric views of an exemplary fiber holder assembly according to the present invention.

Referring to FIGS. 9 and 10, the assembly tool 500 includes a fiber holder assembly 570 having a fiber holder assembly base 572. In a preferred aspect, the fiber holder assembly base 572 is configured to be slidably received in the guide channel (not shown) of the assembly tool base 510. According to an exemplary aspect of this embodiment, assembly tool base 510, fiber holder assembly 570, and components thereof, can be formed or molded from a polymer material.

As shown in FIG. 10, fiber holder assembly 570 includes fiber clamps 592a, 592b, and 592c. The clamps are provided to support and/or temporarily secure an optical fiber during the termination process. In an exemplary embodiment, clamps 592a and 592b can be in the form of containment tubes which prevent premature buckling on the fiber without exerting a restraining force on the movement of the fiber and/or the containment tubes with respect to each other. In this exemplary embodiment, clamp 592c exerts the holding force that grips the fiber and retains it in the fiber holder assembly. Each clamping portion of the fiber holder assembly can include one or more aligned fiber guides or channels to provide more axial support of the fiber along a substantial distance of the assembly tool. For example, fiber guides or channels 591a-591c (FIG. 11A) can be provided. Each of the fiber clamps 592a-592c can include a lid which is pivotally attached to the fiber holder assembly base 572 and can be latched to provide the desired holding force.

In this exemplary embodiment, the fiber clamp 592a is formed as part of a buffer clamp actuator 580. The buffer clamp actuator 580 also includes a funnel-shaped fiber guide (or funnel) 582 that can both guide a fiber and actuate a buffer clamp mechanism of connector 10 held in connector mount 502 (FIG. 9). In addition, fiber clamp or containment tube 592a has a first telescoping tube portion 584 to improve buckle resistance of the optical fiber as the fiber is inserted into the optical connector.

Fiber clamp or containment tube 592b has a second slightly larger diameter telescoping tube portion 594 into which the first telescoping portion can slide during the fiber insertion process. To ensure the proper timing of the opening of clamp 592b, the clamp can have a latch 595 (FIG. 11C) which can be cammed open as the fiber holder assembly is slid forward in the base 510 of assembly tool 500. When the protrusion jig pushes the fiber back, the bow 99' in the fiber will become larger. The bow provides a visual check that the optical fiber has been fully inserted into the optical connector. Optionally, a small biasing arc can be placed within the fiber channel associated with clamp 592b to facilitate the forming of the fiber bow.

Clamp 592c securely holds the fiber within the fiber holder assembly. This clamp mechanism includes a clamping plate hingedly coupled to a portion of the base for holding an optical fiber having any one of several different fiber constructions. This clamp is more fully described in PCT publication no. WO 2009/035776, and the description of this clamp is incorporated herein by reference in its entirety.

In practice, a fiber termination process can utilize the assembly tool 500 to terminate an optical fiber in the field to an optical connector in a straightforward manner. In addition, the field technician can utilize an optical connector that is fully assembled or nearly fully assembled in the factory, such that additional connector assembly is not necessary in the field.

FIGS. 11A-11E show an installation sequence to mount an optical fiber 99 in an optical connector 10. For example, to install an assembled remote grip connector onto an optical fiber, the connector 10 can be inserted into connector coupling or connector mount 502, e.g., by a snap fit.

An optical fiber, such as optical fiber cable 99 can be prepared by stripping and cleaving (flat or angled) to expose the terminal end of the optical fiber. The optical fiber can be prepared prior to insertion in the fiber holder assembly 570 or after insertion in the fiber holder assembly. The fiber jacket/plastic coating can be stripped using a conventional mechanical fiber stripper. A small amount of plastic coating can extend beyond the end of fiber holder assembly 570. The glass portion of the fiber can be wiped clean. Cleaving, using a conventional cleaver can be performed with the fiber being held in the fiber holder assembly 570.

Figure 11A:
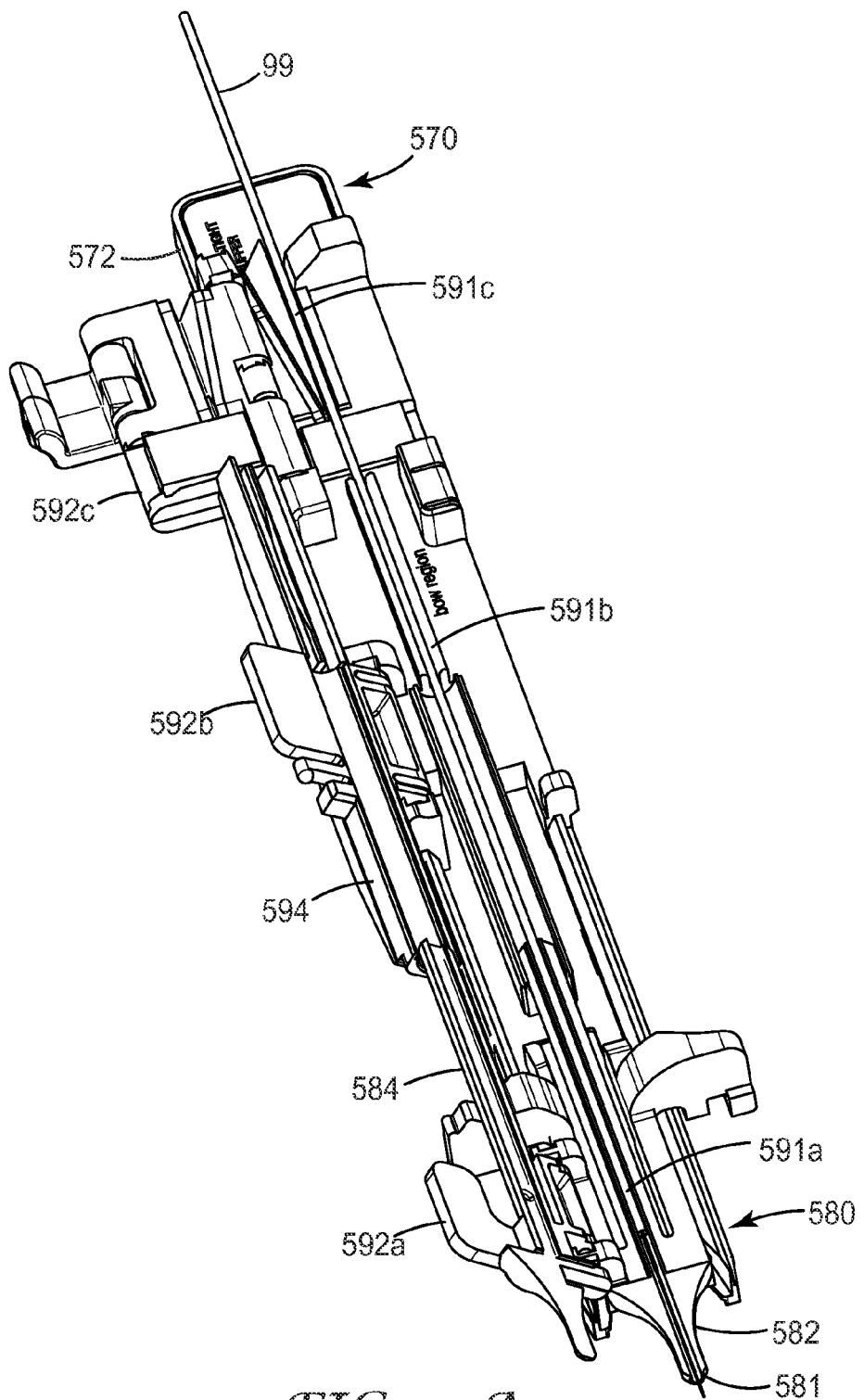
FIGS. 11A-11E show an activation sequence for the assembly tool of FIG. 9.

Referring to FIG. 11A, to position the optical fiber 99 into the fiber holder assembly, the lids of each of the clamps 592a-592c are opened. The fiber is laid in the fiber holder assembly in the guides 591a-591c provided. Optical fiber 99 can be held in place by engaging fiber clamps 592a-592c by placing one or more of the fiber clamps in a closed position. When the buffer clamp actuator 580 is placed in its full forward position, the end of the cleaved fiber will be roughly flush tip portion 581 of the funnel-shaped fiber guide 582 of the buffer clamp actuator.

Figure 11B:
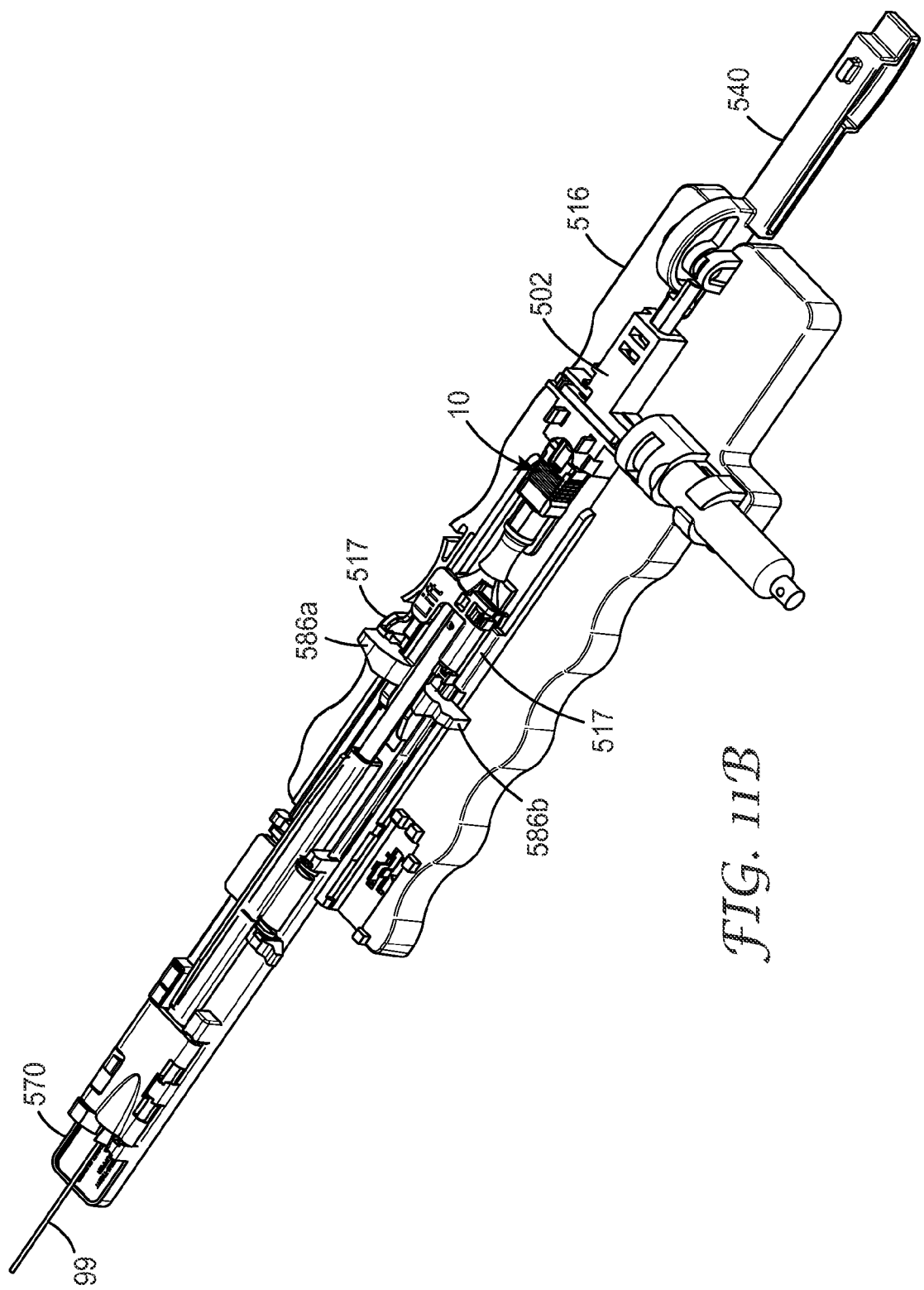

Prior to inserting the fiber holder assembly 570 into assembly to 500, the actuation lever 540 can be moved to the load position as shown in FIG. 11B. The fiber holder assembly 570 can be placed within the guide channel (not shown) in the base 510 of assembly tool 500. The fiber holder assembly is moved forward to insert the optical fiber 99 into connector 10 until the buffer clamp handles 586a, 586b engage with stop 518 on the stop release lever 511 on the base 510.

Figure 11C:
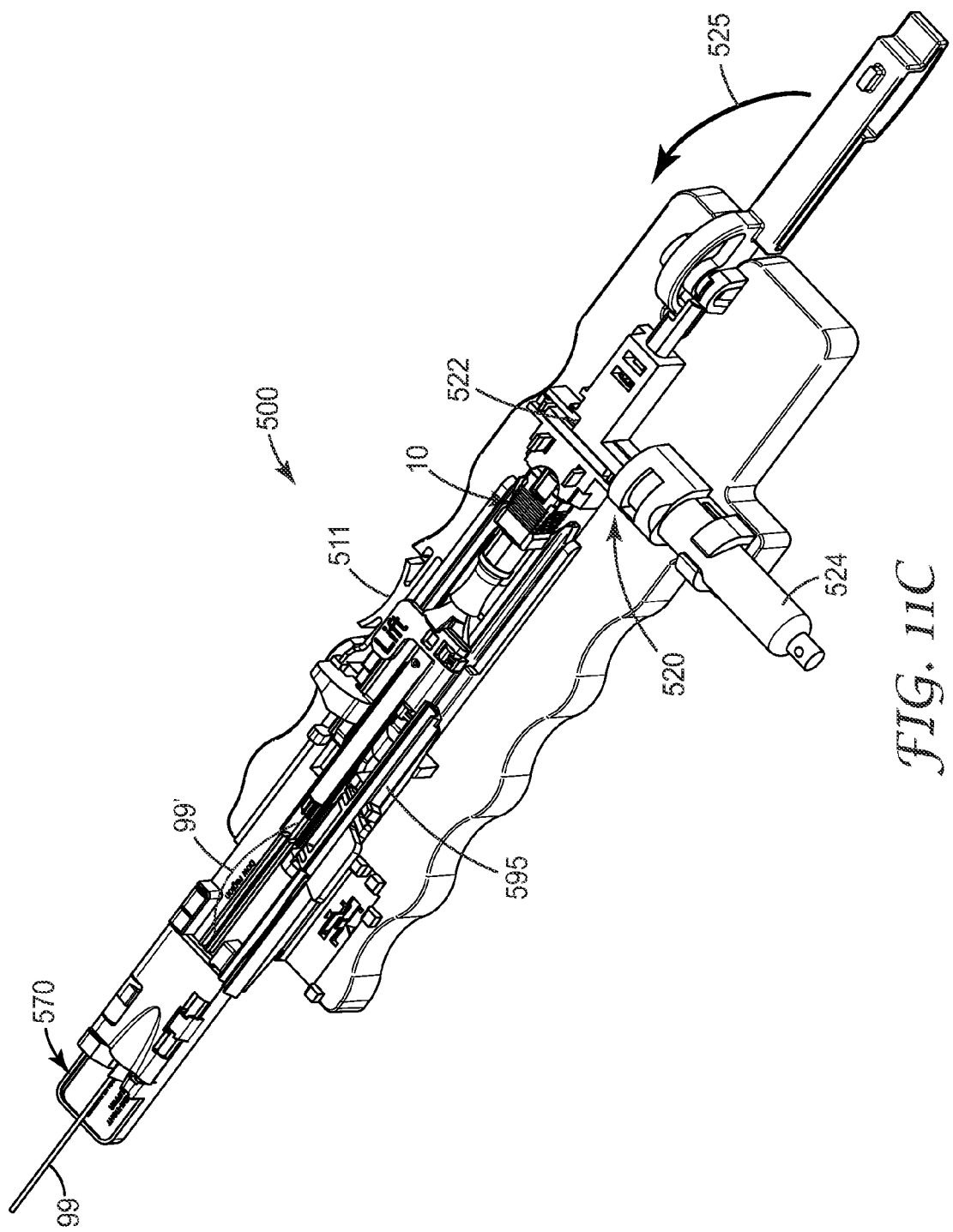
Figure 11D:
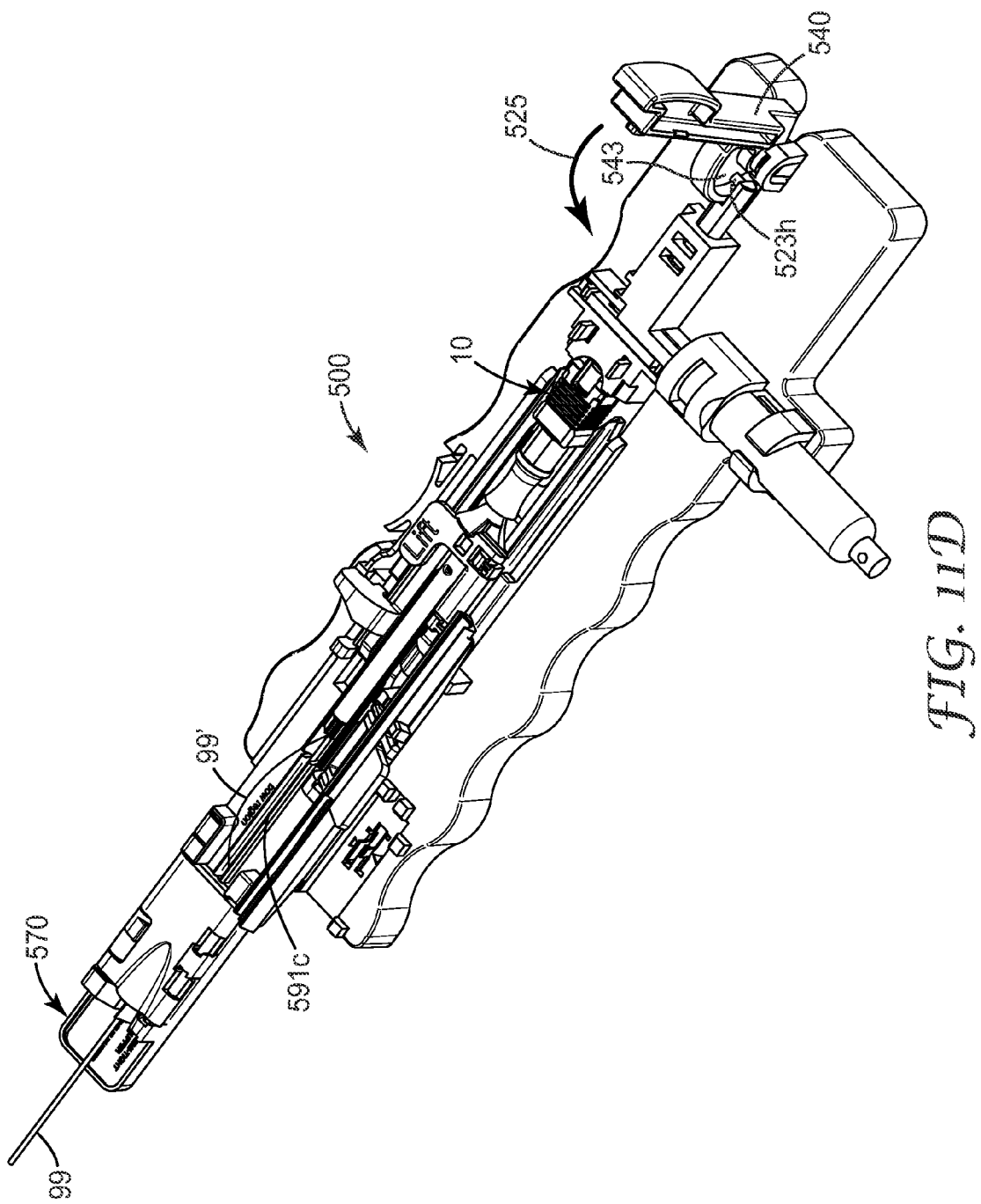

The stop release lever 511 is depressed and the fiber holder assembly continues to move forward as shown in FIG. 11C. The first telescoping tube (not shown) of the buffer clamp actuator 580 moves into the second telescoping tube 594 of clamp 592b. The stripped and cleaved portion of the fiber will continue to move into connector 10 until the 250 μm or 900 μm coating bottoms out within the connector. Just prior to the fiber holder reaching its travel limit, clamp 592b will cam open as shown in FIG. 11D. A fiber bow 99' forms in the area which had been previously covered by clamp 592b. At this point the end of the fiber should have exited through the connector ferrule within the protrusion setting station 520. The light source of the protrusion setting station can be activated. The installer can then verify that the terminal end of the optical fiber has emerged from the ferrule by viewing it through window 522.

Figure 11E:
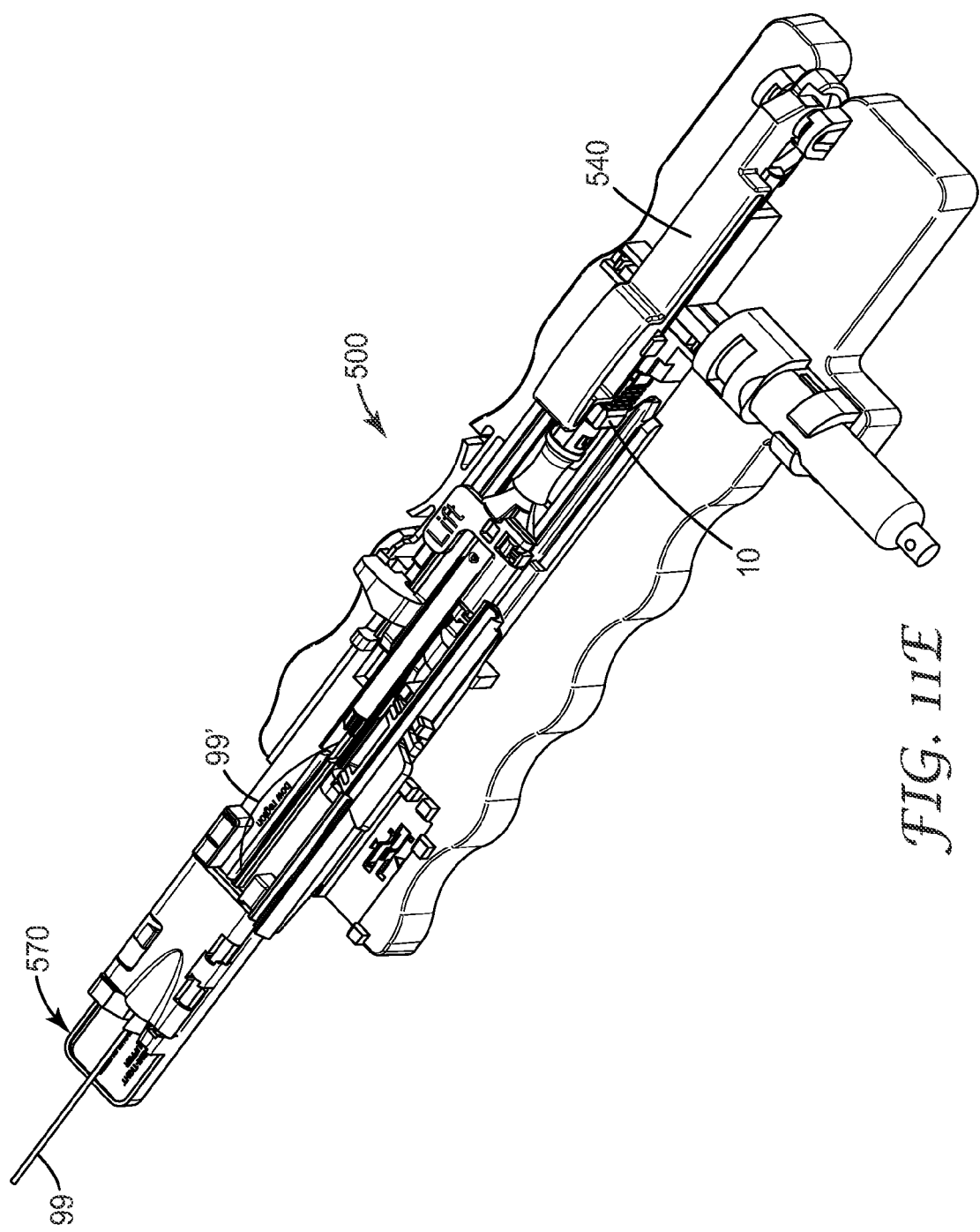

The actuation lever 540 is moved in a direction 525 to activate the protrusion setting jig 523b which pushes the optical fiber back until only the desired length of fiber extends beyond the end face of the ferrule. The installer can observe an increase in the size of the fiber bow 99' after about the first 102° to 150° of rotation of the actuation lever 540 as shown in FIG. 11D. The installer continues the rotation of the actuation lever to 180° and presses down on the free end of the actuation lever to engage the securing cap in the connector as shown in FIG. 11E. This action locks the optical fiber in position within connector 10.

The actuation lever can now be returned to the load position and the remaining clamps 592a and 592c can be opened. The fiber holder assembly 570 may be removed from the assembly tool 500 followed by the removal of terminated connector 10 from the connector mount 502 of the assembly tool.

Thus, the assembly tool of the embodiments described herein provides a low cost, reliable means for terminating an optical fiber with and optical fiber connector. In addition, the ability to precisely set the length of fiber protruding from the end of the ferrule enables the use of a simple one-step finishing operation, if desired. The protrusion setting device can be utilized as a stand alone tool or as part of a complete fiber termination platform.

Although the present invention has been described with reference to preferred embodiments, workers skilled in the art will recognize that changes may be made in form and detail without departing from the scope of the invention.

What is claimed is:

1. An assembly tool for installing an optical fiber in an optical connector, comprising:
   a base having a connector mount disposed thereon, the connector mount configured to receive and secure the optical connector on the base, the connector including a housing and a connector ferrule disposed therein, and
   a protrusion setting station to set a protrusion of a terminal end of the optical fiber, the protrusion corresponding to a distance that the terminal end of the optical fiber extends from an end face of the connector ferrule, wherein the protrusion setting station comprises a light source to illuminate the terminal end of the optical fiber, at least one black body absorber to eliminate unwanted reflected light and a window to visualize the terminal end of the optical fiber.

2. The assembly tool of claim 1, wherein the terminal end of the optical fiber extending from the end face of the connector ferrule focuses and redirects light from the light source when the fiber is inserted into a propagation path of the light.

3. The assembly tool of claim 2, wherein the light is redirected at a vertical angle of about 30° to about 60° relative to the propagation path.

4. The assembly tool of claim 1, wherein the black body absorber comprises at least one of a black body cavity and an extended black body.

5. The assembly tool of claim 1, wherein the black body absorber is a light trap.

6. The assembly tool of claim 5, wherein the at least one light trap provides a substantially black background against which to view the protruding optical fiber over a range of possible viewing angles.

7. The assembly tool of claim 5, wherein a second light trap captures excess light from the illumination source after it has passes the optical fiber, assuring that said excess light does not create stray reflections.

8. The assembly tool of claim 1, wherein the optical connector is a remote grip optical connector.

9. The assembly tool of claim 1, wherein the protrusion setting station comprises a cam assembly including a protrusion setting jig wherein the protrusion setting jig is slidably engageable with the terminal end of an optical fiber extending from the end face of a connector ferrule.

10. The assembly tool of claim 1, wherein the light source is selected from one of reflected ambient light, a flashlight and a light emitting diode.

11. The assembly tool of claim 1, wherein the end face of the connector ferrule has a substantially nonreflecting finish.

12. The assembly tool of claim 1, wherein the connector mount further comprises an interchangeable connector plate.

13. The assembly tool of claim 1, further comprising a lens disposed in a light path between the light source and the terminal end of the optical fiber to focus light from the light source on the optical fiber.

14. The assembly tool of claim 1, further comprising an actuation mechanism to press a securing cap over a splice element within the optical connector to secure the optical fiber within the optical connector.

15. The assembly tool of claim 14, wherein the actuation mechanism comprises an actuation lever, that engages a protrusion setting jig within the protrusion setting station to set the protrusion of the optical fiber and presses the securing cap over the splice element within the optical connector in a single continuous movement of the actuation lever.

16. The assembly tool of claim 1, further comprising a fiber holder assembly is slidably engageable with the base of the assembly tool, wherein the fiber holding assembly has a first telescoping tube and a second telescoping tube to prevent buckling of the optical fiber as the optical fiber is inserted into the optical connector.

* * * * *